US008150542B2

(12) United States Patent
Roth et al.

(10) Patent No.: US 8,150,542 B2
(45) Date of Patent: Apr. 3, 2012

(54) POSITIONING AND ORIENTING A UNIT OF A HEARING DEVICE RELATIVE TO INDIVIDUAL'S HEAD

(75) Inventors: Samuel Hans Martin Roth, Staefa (CH); Stefan Haenggi, Murten (CH); Christoph Widmer, Wernetshausen (CH)

(73) Assignee: Phonak AG, Staefa (CH)

( * ) Notice: Subject to any disclaimer, the term of this patent is extended or adjusted under 35 U.S.C. 154(b) by 113 days.

(21) Appl. No.: 11/423,975

(22) Filed: Jun. 14, 2006

(65) Prior Publication Data

US 2008/0118094 A1 May 22, 2008

(51) Int. Cl.
*G06F 19/00* (2011.01)
*G06T 15/00* (2011.01)
*H04R 25/00* (2006.01)

(52) U.S. Cl. ........... 700/118; 700/98; 345/419; 381/328

(58) Field of Classification Search .............. 700/96–98, 700/118, 182; 345/419, 420; 381/150, 312, 381/322, 328; 703/6, 13
See application file for complete search history.

(56) References Cited

U.S. PATENT DOCUMENTS

| | | | | |
|---|---|---|---|---|
| 5,487,012 | A * | 1/1996 | Topholm et al. | 700/163 |
| 5,645,074 | A * | 7/1997 | Shennib et al. | 600/559 |
| 5,741,215 | A * | 4/1998 | D'Urso | 600/407 |
| 5,781,637 | A * | 7/1998 | Heide et al. | 381/328 |
| 6,006,126 | A * | 12/1999 | Cosman | 600/426 |
| 6,533,062 | B1 * | 3/2003 | Widmer et al. | 181/129 |
| 6,540,045 | B1 * | 4/2003 | Widmer et al. | 181/135 |
| 6,879,697 | B2 * | 4/2005 | Tøpholm | 381/322 |
| 6,920,414 | B2 * | 7/2005 | Tøpholm | 703/1 |
| 7,050,876 | B1 * | 5/2006 | Fu et al. | 700/118 |
| 7,185,734 | B2 * | 3/2007 | Widmer et al. | 181/135 |
| 7,286,679 | B2 * | 10/2007 | Fang et al. | 381/322 |
| 7,308,328 | B2 * | 12/2007 | Fang et al. | 700/98 |
| 7,328,080 | B2 * | 2/2008 | Fu et al. | 700/118 |

(Continued)

FOREIGN PATENT DOCUMENTS

EP 1246506 A1 10/2002

(Continued)

OTHER PUBLICATIONS

Tornola G et al. "3D-coordinate measurement system and image reconstruction of anatomical parts from unorganized data clouds." Instrumentation and Measurement Technology Conference, 2004. IMTC 04. Proceedings of the 21st IEEE Como, Italy May 18-20, 2004, Piscataway, NJ, USA, IEEE, US, May 18, 2004, pp. 487-490vol. 1.

(Continued)

*Primary Examiner* — Albert Decady
*Assistant Examiner* — Jennifer L. Norton
(74) *Attorney, Agent, or Firm* — Pearne & Gordon LLP

(57) ABSTRACT

Digital models of the application areas of a left-ear and of a right-ear hearing device are established. The models (140$_{r\#}$ and 140$_{l\#}$) are displayed on a computer display. The location of the model (SP$_{\#}$) of the sagittal plane of individual's head is estimated with respect to one of the two digital mold models. Then that one digital model (140$_{r\#}$) is digitally mirrored at the digital model of the sagittal plane (SP$_{\#}$) resulting in a mirrored digital model (140$_{m\#}$). Then the other digital model of the application area (140$_{l\#}$) and the mirrored digital model (140$_{mr\#}$) are brought into best possible covering alignment (140'$_{l\#}$). Units to be positioned in predetermined mutual relationship are applied to the models in best possible alignment.

12 Claims, 14 Drawing Sheets

U.S. PATENT DOCUMENTS

Figure 1:
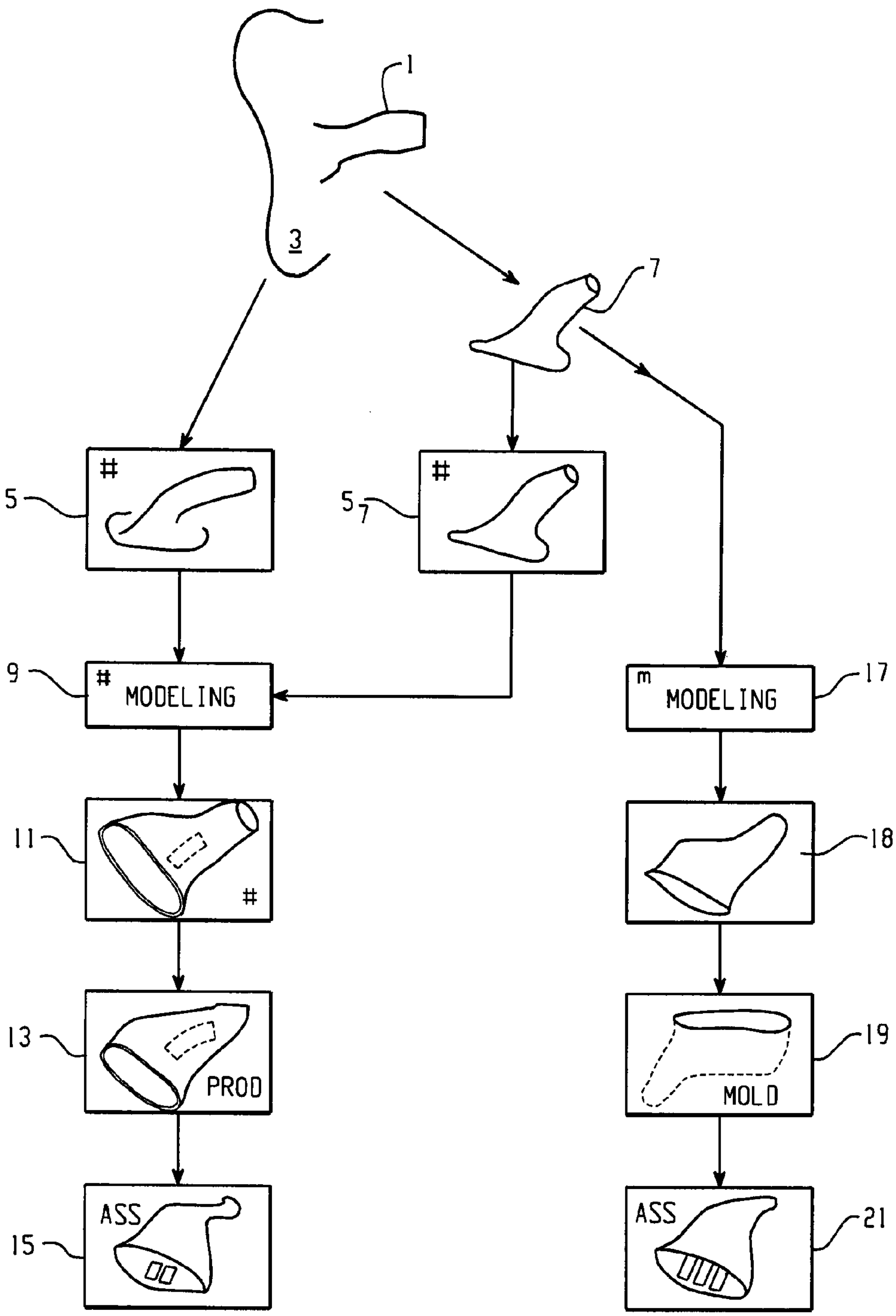

| | | | | |
|---|---|---|---|---|
| 7,387,187 | B2 * | 6/2008 | Widmer et al. | 181/130 |
| 7,447,556 | B2 * | 11/2008 | McBagonluri et al. | 700/98 |
| 7,474,758 | B2 * | 1/2009 | Beck et al. | 381/313 |
| 7,875,232 | B2 * | 1/2011 | Parsi et al. | 264/401 |
| 7,933,425 | B2 * | 4/2011 | Niederdrank | 381/322 |
| 2003/0021434 | A1 * | 1/2003 | Hessel et al. | 381/312 |
| 2004/0107080 | A1 * | 6/2004 | Deichmann et al. | 703/6 |
| 2004/0196995 | A1 * | 10/2004 | Roth et al. | 381/322 |
| 2005/0197562 | A1 * | 9/2005 | Graessner | 600/410 |
| 2005/0222823 | A1 * | 10/2005 | Brumback et al. | 703/1 |
| 2006/0045297 | A1 * | 3/2006 | Haussmann | 381/322 |
| 2007/0057941 | A1 * | 3/2007 | Fang et al. | 345/419 |
| 2007/0147642 | A1 * | 6/2007 | Kasanmascheff | 381/322 |
| 2007/0293972 | A1 * | 12/2007 | Roth et al. | 700/118 |
| 2008/0253595 | A1 * | 10/2008 | Steinbuss | 381/312 |
| 2009/0022345 | A1 * | 1/2009 | Fischer et al. | 381/313 |
| 2009/0097682 | A1 * | 4/2009 | McBagonluri et al. | 381/322 |
| 2010/0318208 | A1 * | 12/2010 | Schiller et al. | 700/98 |

FOREIGN PATENT DOCUMENTS

| | | | |
|---|---|---|---|
| EP | 1345470 | A2 | 9/2003 |
| GB | 2344556 | A | 6/2000 |

OTHER PUBLICATIONS

International Search Report dated Feb. 21, 2007 in reference to international application No. PCT/EP2006/063203.

* cited by examiner

POSITIONING AND ORIENTING A UNIT OF A HEARING DEVICE RELATIVE TO INDIVIDUAL'S HEAD

The present invention departs from a manufacturing method for a hearing device with a shell and with a unit therein. The unit is spatially oriented in a predetermined manner relative to a first orientation system, which is external to the device and which is established as the device is worn by the individual.

Units at a hearing device which should be located and oriented in a predetermined manner relative to an external orientation system whenever the device is worn by the individual are especially input acoustical-to-electrical converter arrangements, wireless transmission input and/or output ports, thereby especially receiver and/or transmitter antennas for Rf communication. Whereas the spatial orientation of input acoustical-to-electrical converter arrangements may be defined generically with respect to individual's head, e.g. for proper orientation of a reception beam, in some cases transmitter and/or reception antennas must be localized and oriented in a hearing device relative to an orientation system which is not part of individual's head, e.g. relative to a further antenna, which is especially true in binaural hearing systems, where the two hearing devices with their antennas are in mutual communication.

The present invention seeks a solution for properly positioning and orienting such units at a hearing device relative to individual's head, and/or relative to a further orientation system which needs not be part of individual's head, as e.g. relative to a unit at a further hearing device.

To do so, there is proposed a method of manufacturing a hearing device which has a shell and which has a unit therein. The unit is spatially oriented in a predetermined manner relative to a first orientation system, which is external to the hearing device and which is established as the hearing device is worn by an individual. Thus e.g. the first orientation system may be a system as defined by a communication antenna at a second hearing device.

The addressed method comprises

- generating a digital model of an application area for the hearing device at the individual;
- selecting a second orientation system at the individual.

Thereby, this second orientation system has to be at the individual and especially preferably at individual's head as e.g. based on sagittal plane, nose of the individual or horizontal line of sight direction.

After selecting the addressed second orientation system there is performed

- providing and preserving information which defines localization, including orientation, of the application area and of the first orientation system relative to the second orientation system;
- generating a digital model of the shell with the unit, thereby exploiting the digital model of the application area and the addressed information as preserved.

Finally, the shell with the unit is manufactured in dependency of the addressed digital model of the shell with the unit.

In one embodiment the second orientation system is selected to be the first orientation system or vice versa.

Thereby, if e.g. a unit at the one hearing device is to be oriented in a predetermined manner with respect to the horizontal line of sight, then the first orientation system is obviously based on this horizontal line of sight at individual's head and this system is simultaneously the second orientation system as addressed.

In one embodiment the second orientation system is based on the horizontal line of sight of the individual.

Still in a further embodiment the second orientation system is selected to be based on the sagittal plane of the individual.

Still in a further embodiment the first orientation system is based on a unit which is applied to a further application area of the individual.

Still in a further embodiment the addressed unit is an acoustical-to-electrical converter arrangement or an input and/or output port for a wireless receiver/transmitter or a receiver and/or transmitter antenna.

Still in a further embodiment the further unit is provided in a further hearing device for the individual.

In one embodiment, wherein the second orientation system is selected to be based on the sagittal plane of the individual, the first reference system is a further unit at a further hearing device. The method thereby comprises providing a digital model of the sagittal plane in the digital model of the application area. Then there is generated a digital model of a further application area for the further hearing device at the individual. The digital model of the application area is mirrored at the model of the sagittal plane. Then the mirrored digital model and the digital model of the further application area are digitally brought in best-possible mutual covering position and the unit and the further unit are digitally modelled in said models in mutual covering position. Then the digital model of the application area with the model of the unit is backmirrored at the model of the sagittal plane. Thereby, in a further embodiment the hearing device as well as the further hearing device are parts of a binaural hearing system.

Still in a further embodiment the hearing device as addressed and/or the further hearing device is or are one of a completely-in-the-canal hearing device, an in-the-ear hearing device, an outside-the-ear hearing device. Thereby, in a further embodiment the one or both of the addressed hearing devices are hearing aid devices.

Definitions:

We understand under a hearing device throughout the present description and claims a device which is worn at least adjacent to an individual's one ear with the object to improve individual's acoustical perception. Such an improvement may also be barring acoustical signals for being perceived in the sense of hearing protection for the individual.

If hearing devices are worn on both individual's ears and are in mutual communication then we speak of a binaural hearing system. Characteristics, which are described in context with the hearing device do normally apply also to hearing devices of a binaural hearing system.

A hearing device may further be a device to positively improve individual's acoustical perception, whether such individual has an impaired perception or not.

If the hearing device is tailored so as to improve the perception of a hearing-impaired individual, then we speak of a hearing aid device.

With respect to the application area a hearing device may especially be applied behind the ear, in the ear or even completely in the ear canal. Accordingly, the requirements with respect to compactness of construction become more and more severe.

We understand under an orientation system a system relative to which a vector in three-dimensional space is accurately defined by a set of data. Such a system may e.g. be a right-handed Cartesian coordinate system, where a set of six scalars define each vector in three-dimensional space.

The invention will now be exemplified with help of figures, thereby opening to the skilled artisan a huge scope of different possibilities to practice the present invention.

Figure 2:
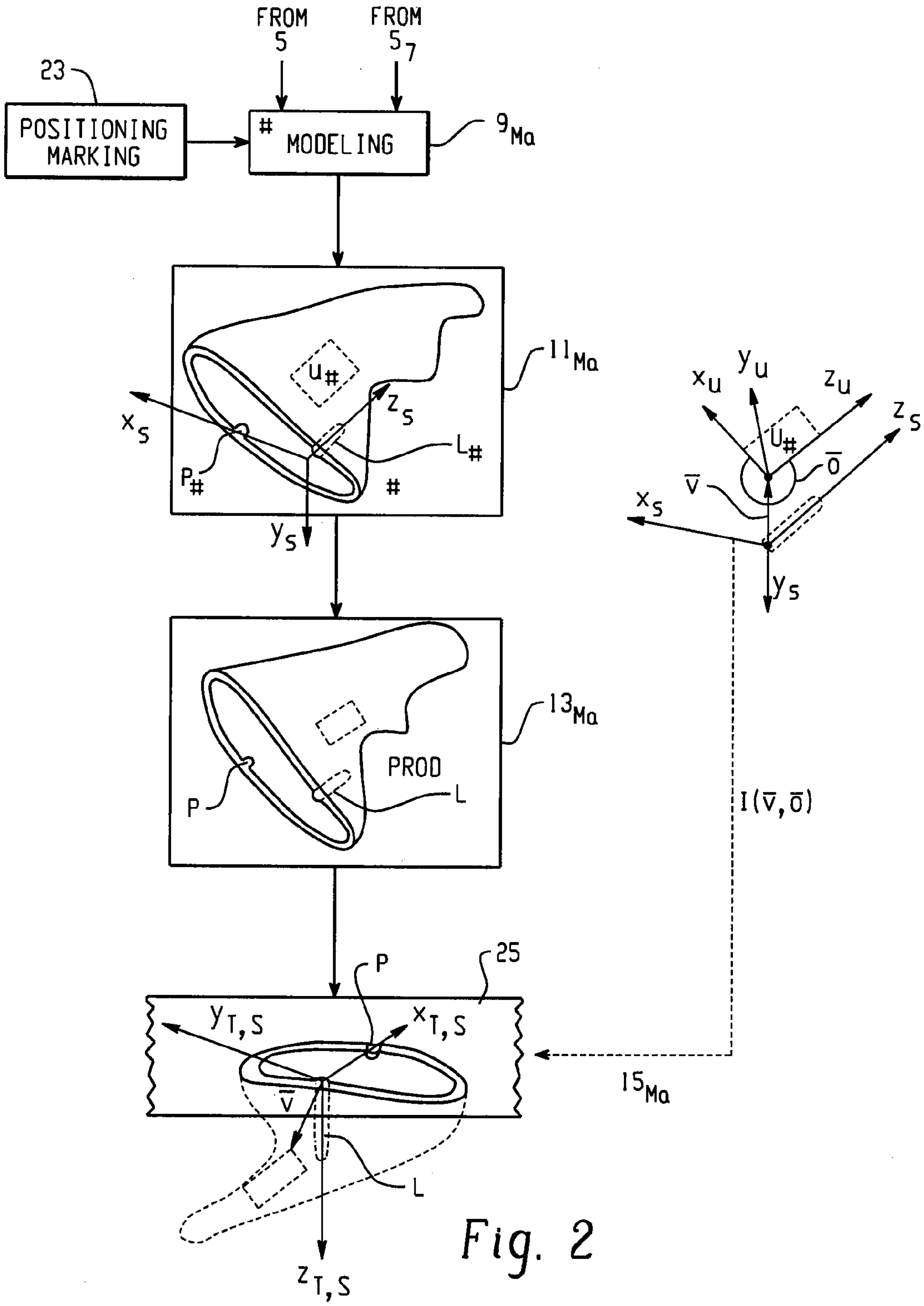
Figure 3:
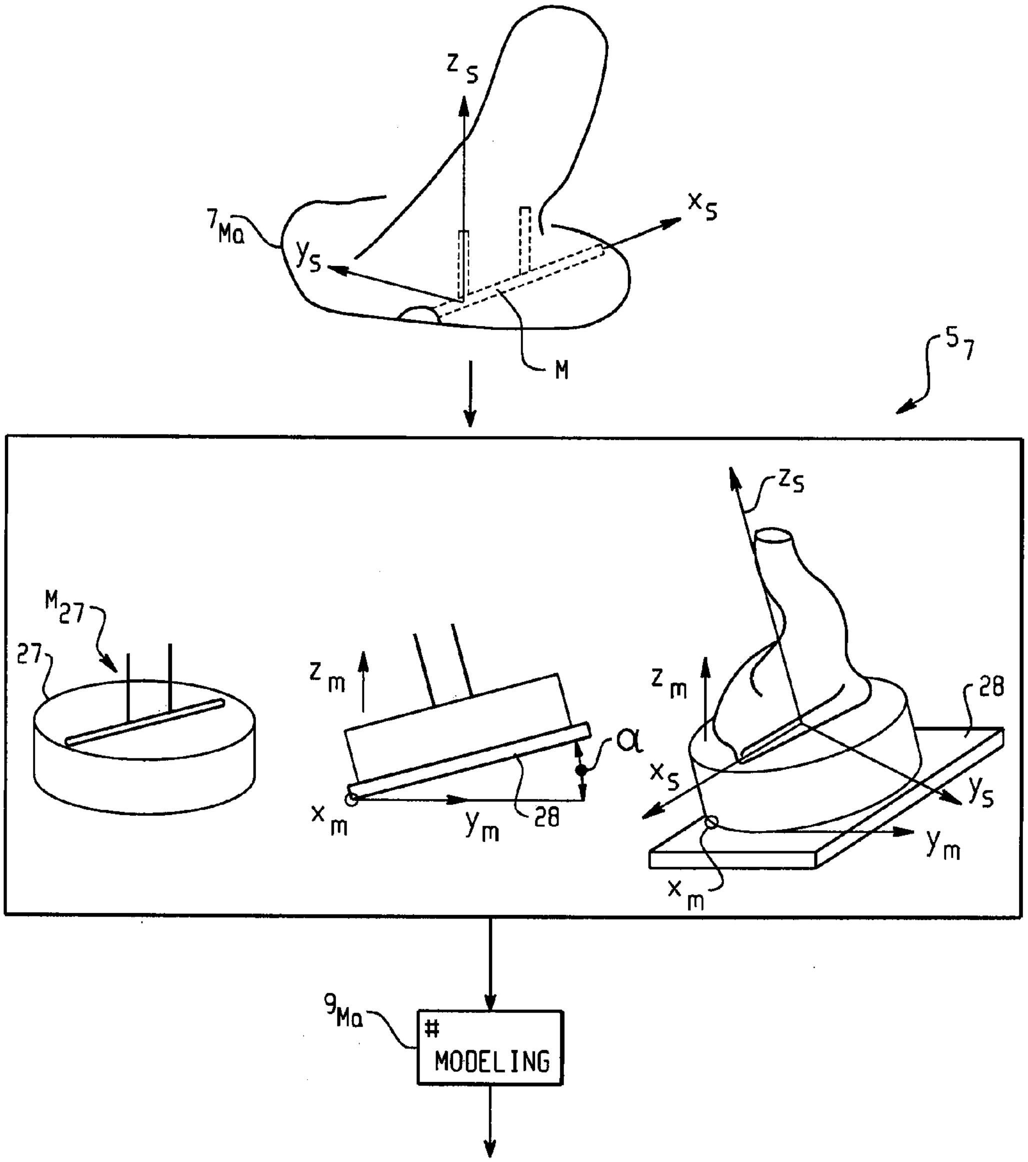
Figure 4:
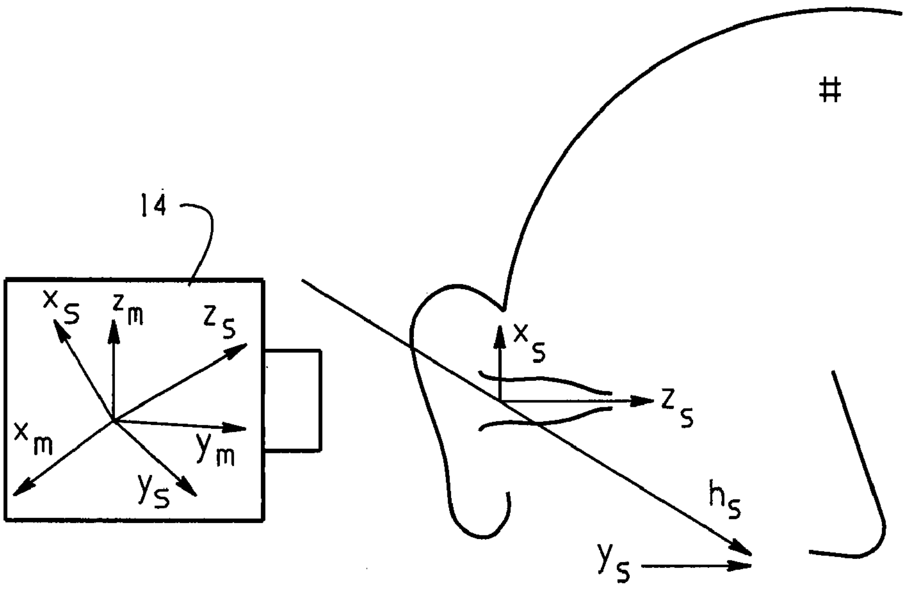
Figure 5:
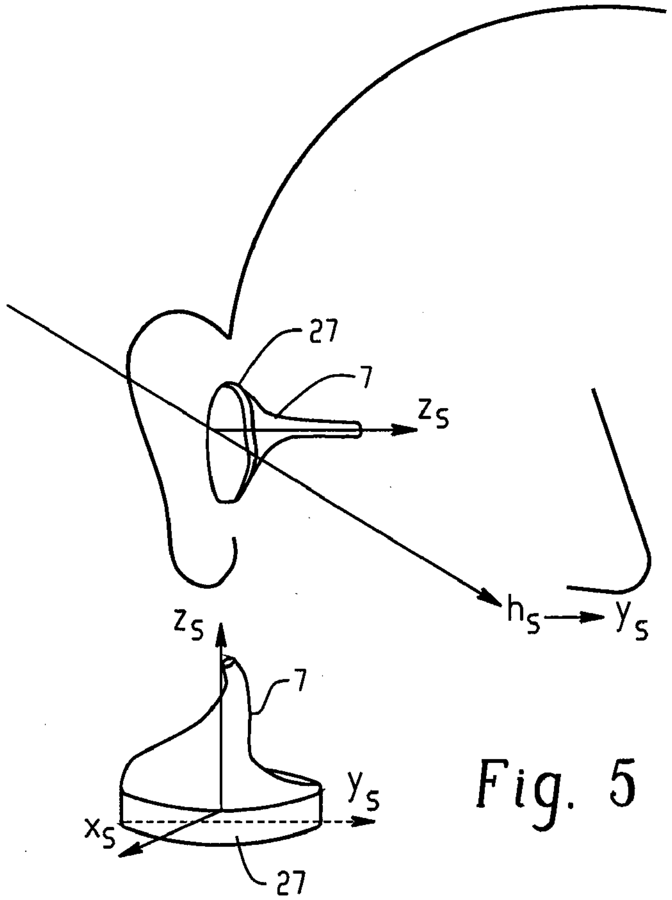
Figure 6:
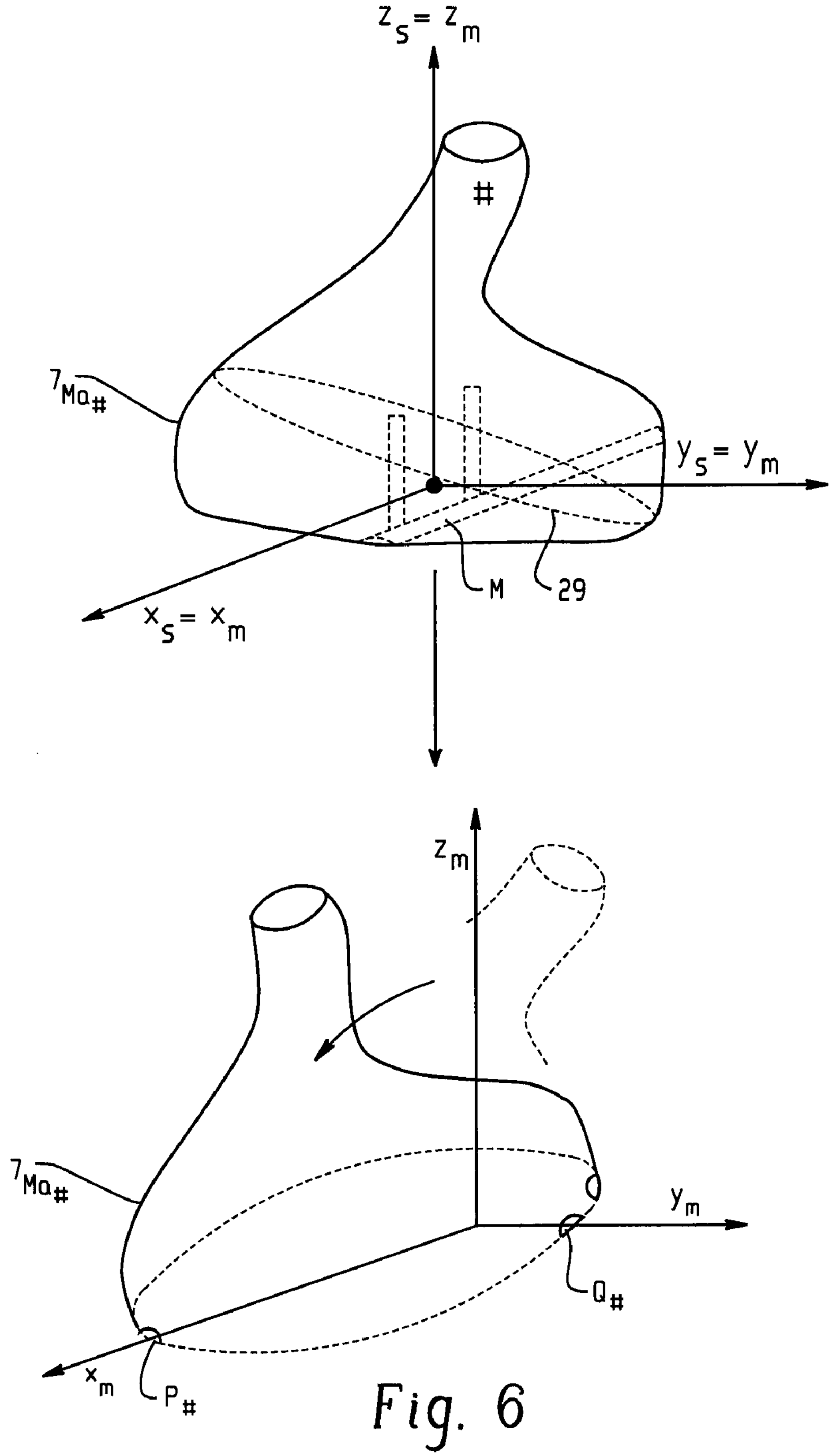
Figure 7:
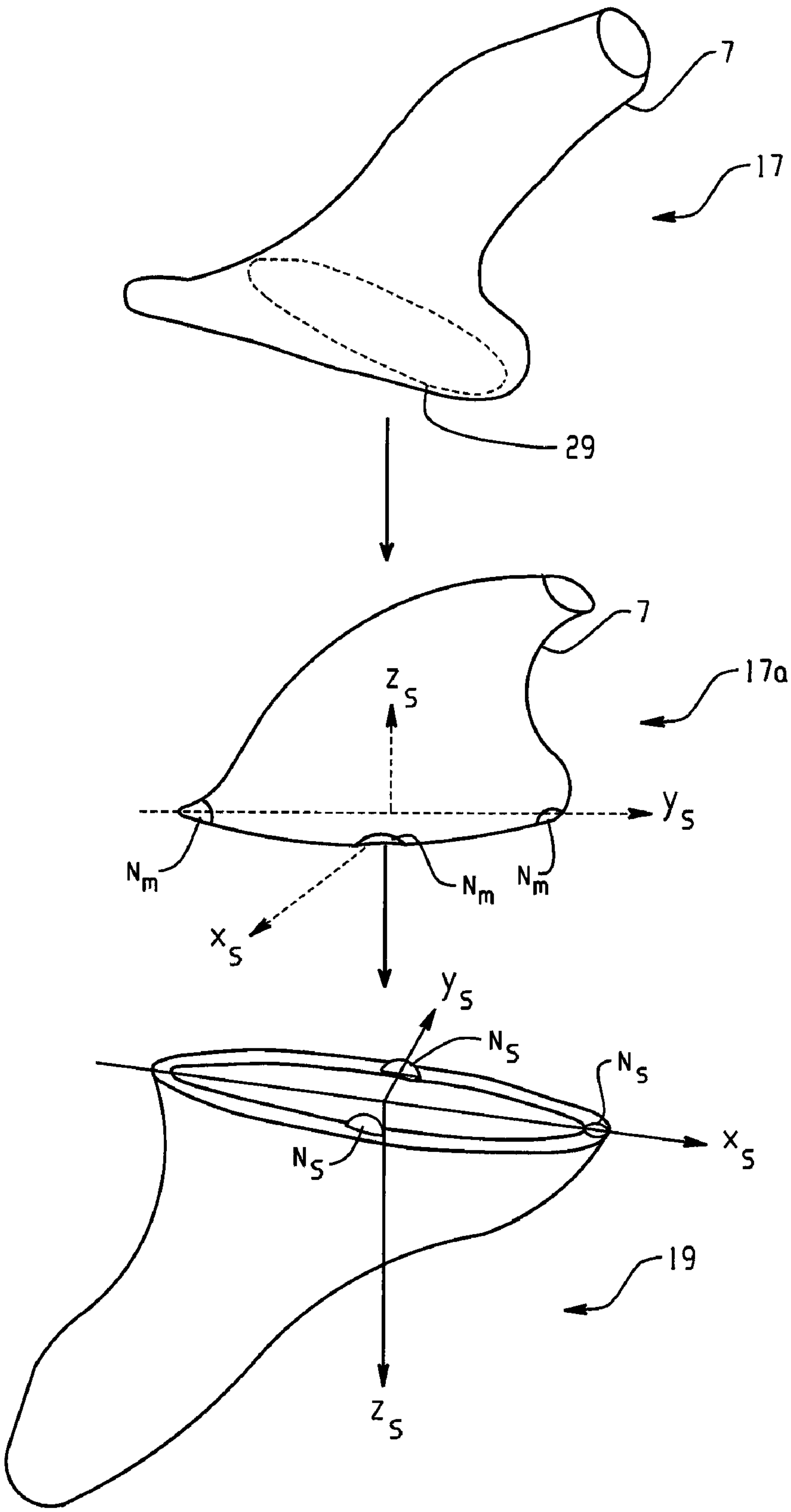
Figure 8:
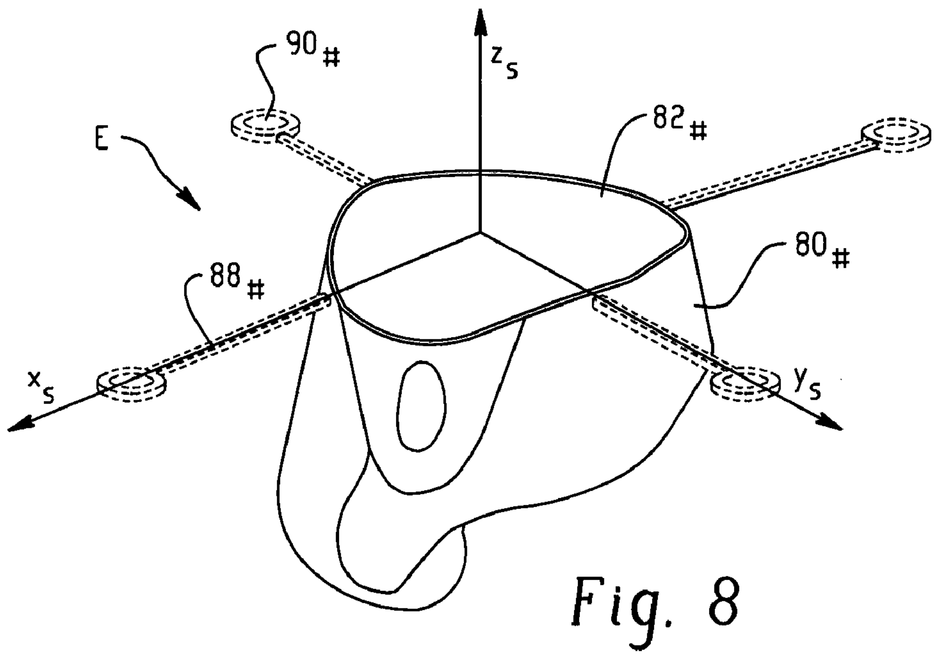
Figure 9:
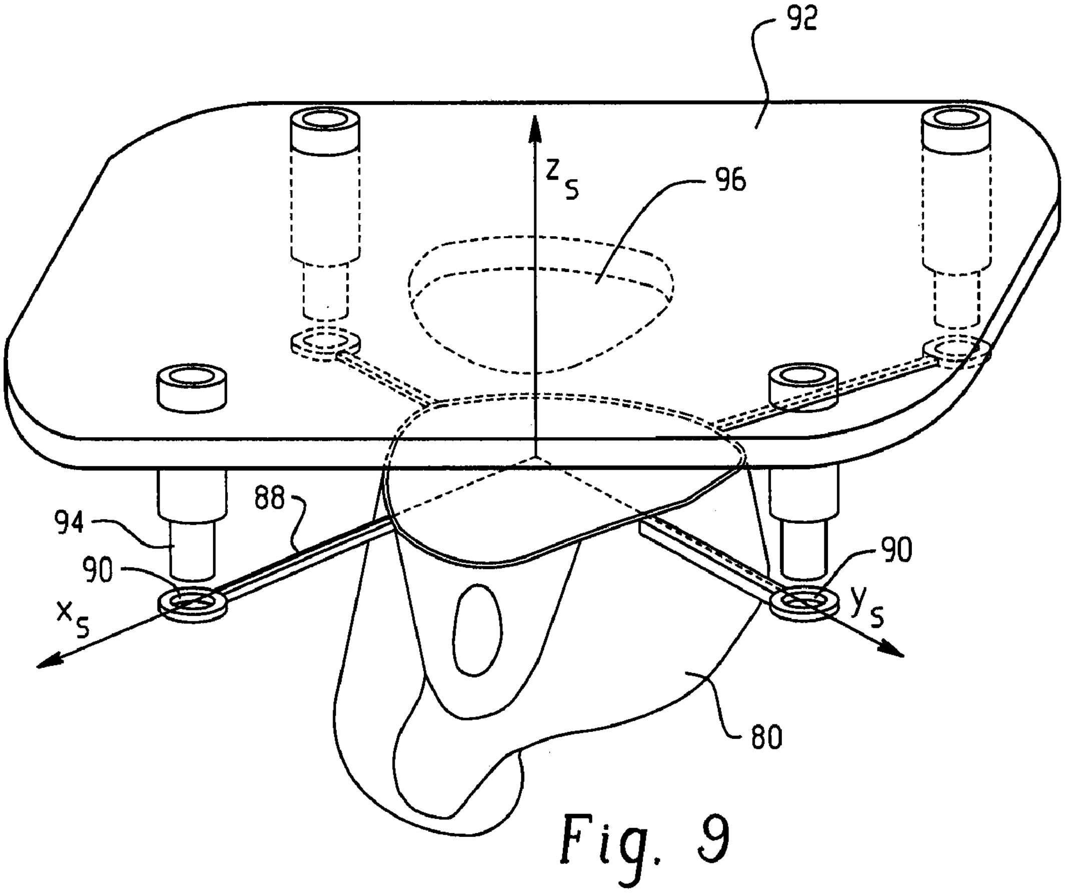

The figures show:

FIG. 1 by means of a functional-block diagram customary methods of hearing device manufacturing;

FIG. 2 in a block-diagrammatic representation in analogy to that of FIG. 1 a first embodiment of the present invention whereat embossments and/or protrusions are realised at the shell for identifying a three-dimensional orientation system improving assembling accuracy;

FIG. 3 in a block-diagrammatic representation a further embodiment of the present invention whereat the three-dimensional orientation system is provided at a mold or at a support of a mold;

FIG. 4 schematically, exploiting the horizontal direction of sight of an individual as part of an orientation system for in situ scanning;

FIG. 5 in a representation analogous to that of FIG. 4 exploiting the direction of horizontal sight of an individual as a part of the orientation system for mold-taking and mold-scanning technique;

FIG. 6 a schematic representation of mold modelling;

FIG. 7 in a representation in analogy to FIG. 6 a further embodiment of mold modelling;

FIG. 8 in a perspective view, a further embodiment of the present invention whereat during modelling guiding members for faceplate assembling are provided which additionally define for the three-dimensional orientation system;

FIG. 9 in a representation according to that of FIG. 8 a further step towards assembling a faceplate to a shell based on the guiding members still defining for the three-dimensional orientation system;

FIGS. 10 and 11 again in a perspective representation, further possibilities which are opened by exploiting the technique as explained in context with FIGS. 8 and 9.

Figure 12:
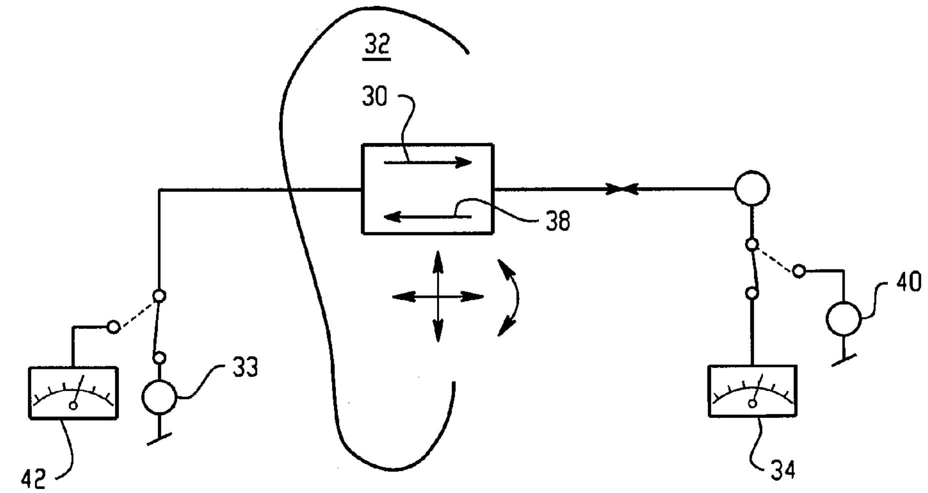
Figure 13:
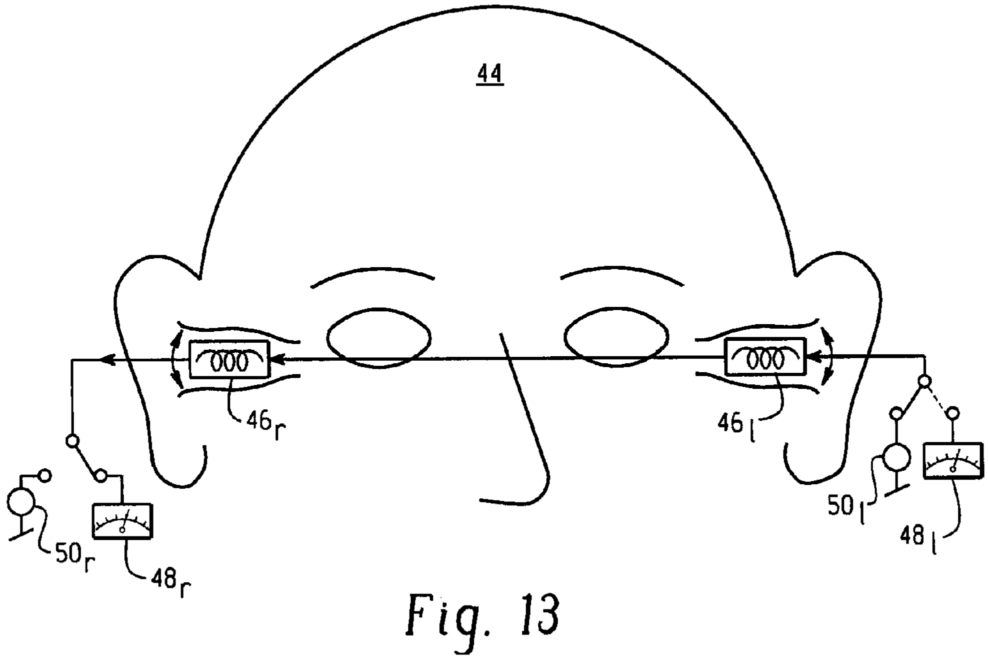
Figure 14:
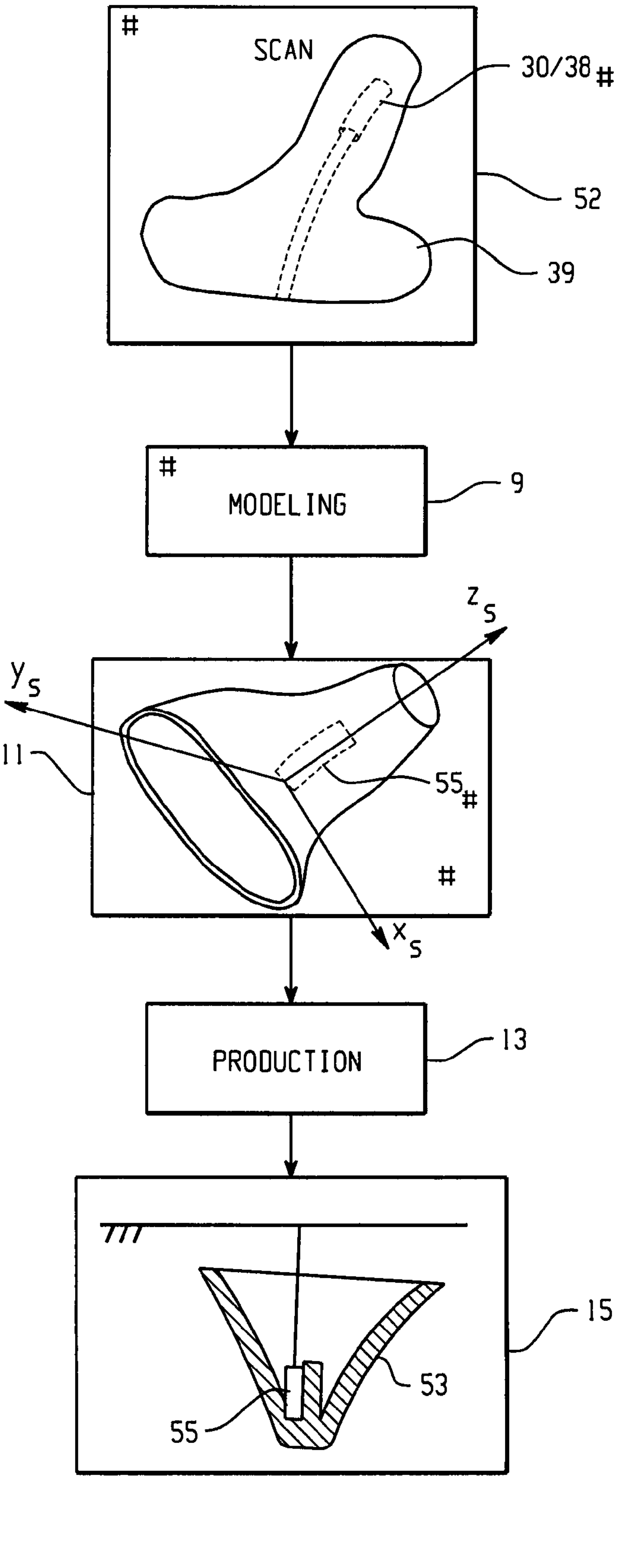
Figure 15:
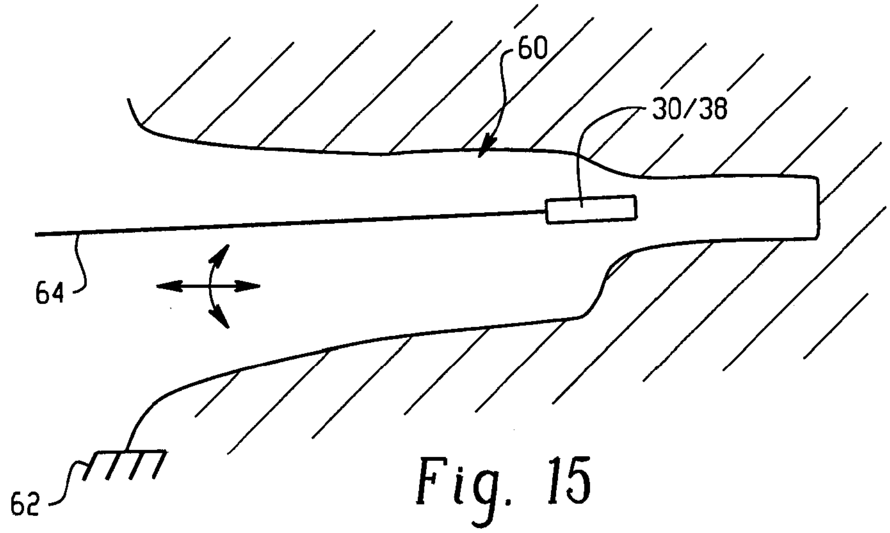
Figure 16:
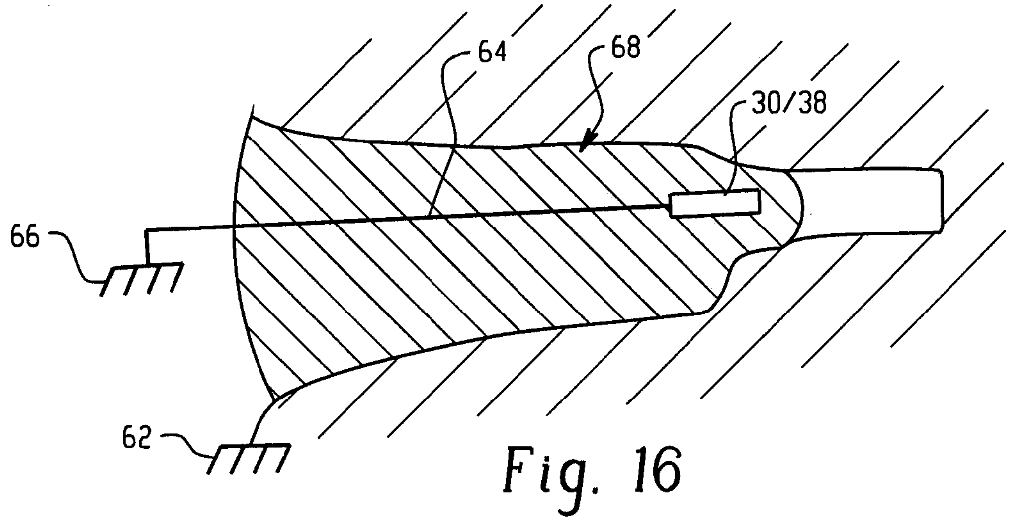
Figure 17:
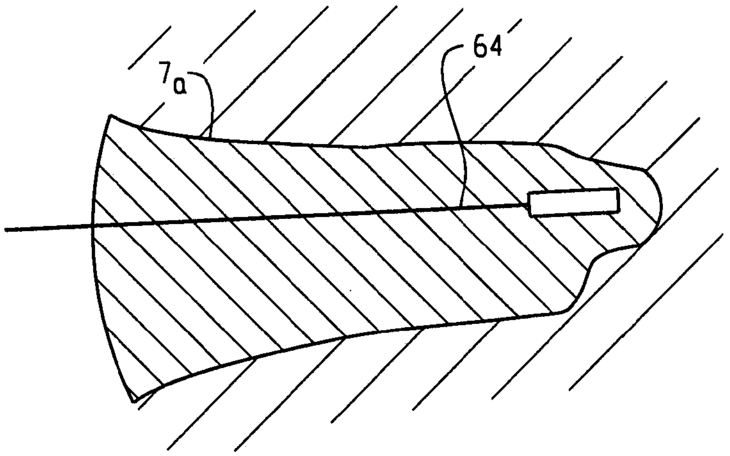
Figure 18:
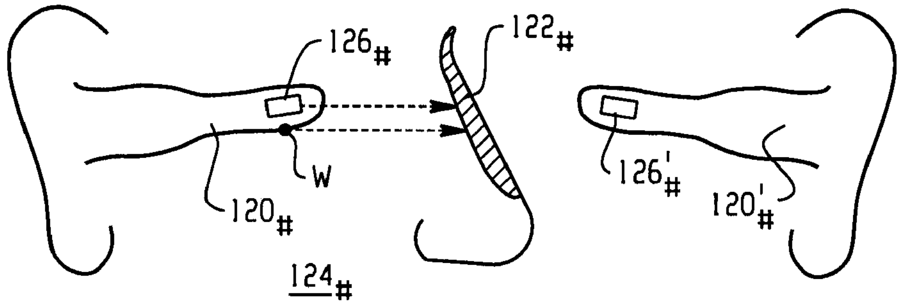
Figure 19:
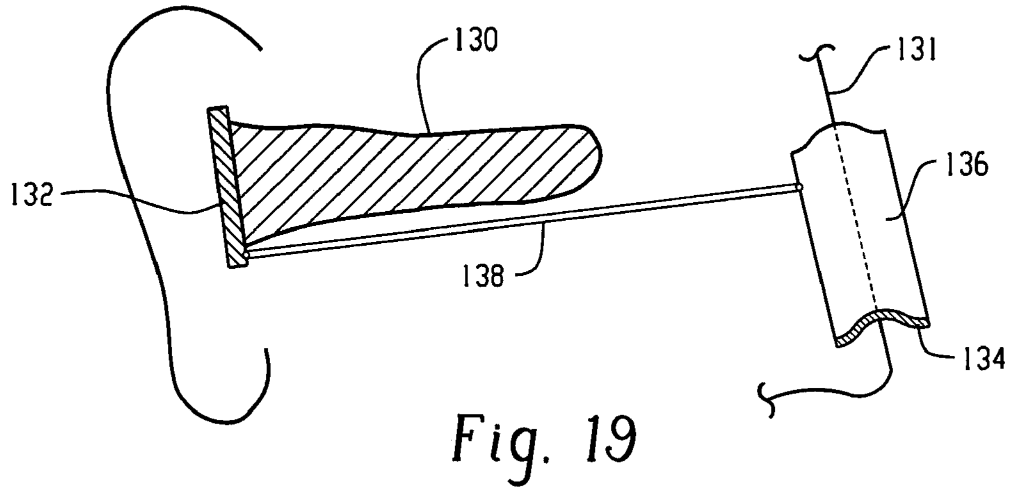
Figure 20:
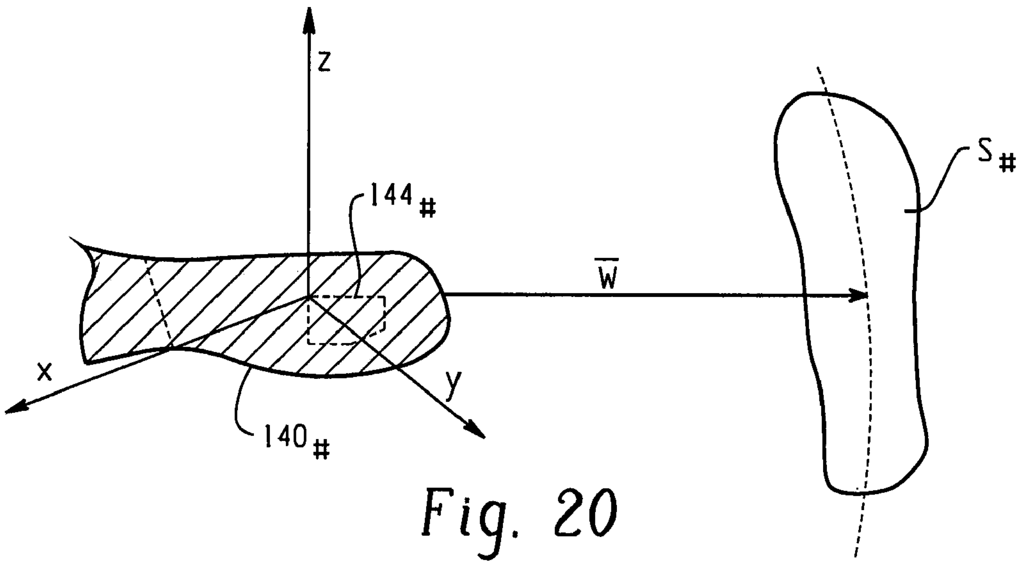
Figure 21:
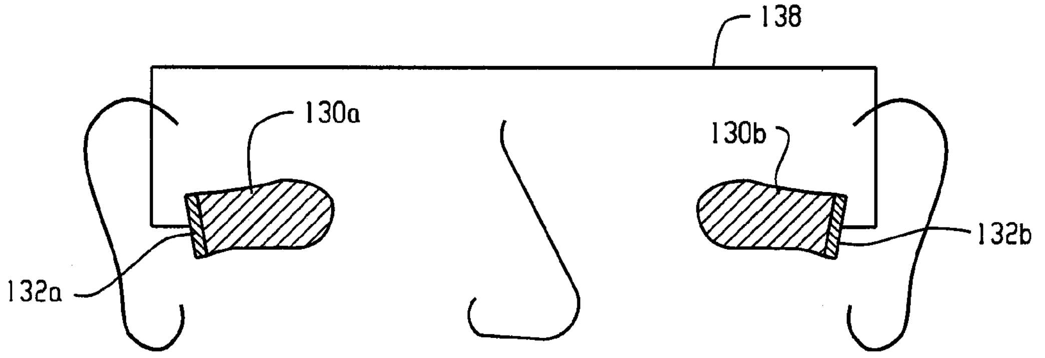
Figure 22:
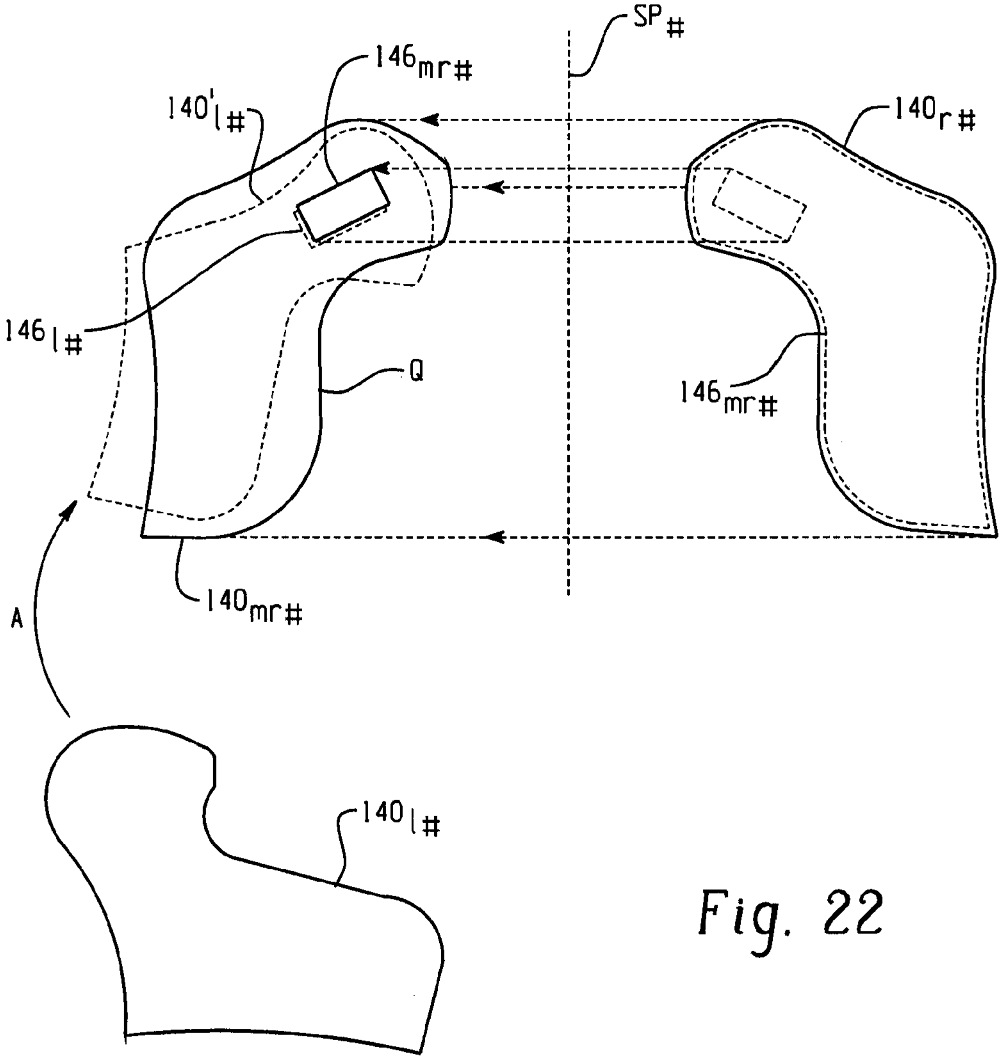
Figure 23:
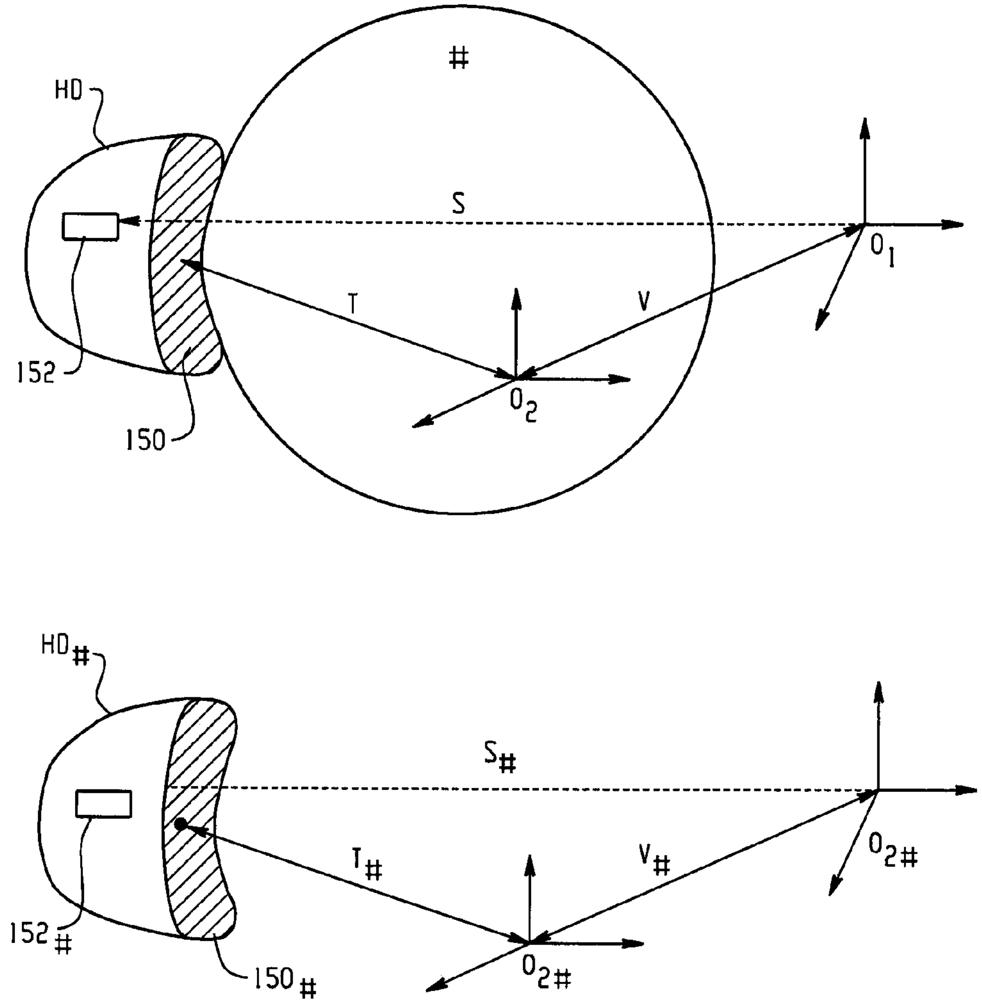

FIG. 12 schematically and by means of a functional-block/signal-flow diagram, positioning of an orientation-sensitive unit (OSU) at an application area;

FIG. 13 departing from the technique as explained in context with FIG. 12 a technique of finding optimum mutual positioning of antennas at a binaural hearing system;

FIG. 14 by means of a block-diagram, exploitation of a positioning technique as has been addressed in FIGS. 12 and 13 for defining and identifying the three-dimensional orientation system;

FIG. 15 to 17 a further embodiment for accurately locating and orienting an OSU in a mold taken from the application area;

FIG. 18 in a simplified representation a further embodiment for proper locating and orienting a unit at a model including the application area as well as a further significant part of individual's head;

FIG. 19 departing from the teaching of FIG. 18 most simplified an embodiment for geometrically linking position and orientation of a part of a mold to a specific area of individual's head;

FIG. 20 more generalised the approach as exemplified in FIG. 19 thereby additionally showing provision of the three-dimensional orientation system as exploited according to the present invention;

FIG. 21 a technique as exemplified in FIG. 19 applied for binaural hearing devices;

FIG. 22 a further embodiment by which especially communication antennas of the hearing devices in a binaural hearing system are properly aligned and where respective mounts for such antennas define for a respective three-dimensional orientation system for assembling each of the two devices, and FIG. 23 most schematically, the principal of one aspect of the present invention, namely of establishing an external orientation system e.g. bound to individual's head for accurate assembling of units.

1. INTRODUCTION

The generic object of the present invention and under its different aspects is related to positioning specific units within or at a shell of a hearing device. Customary manufacturing methods for hearing devices are shown in FIG. 1 in functional-block representation. In FIG. 1 there is shown by ref. no. 3 an ear of an individual with an application area 1 whereat the hearing device, individualised for the specific individual, shall be applied. As an example the application area 1 is shown as the ear canal of the ear 3.

In one customary approach for manufacturing the hearing device to be applied at the application area 1 the three-dimensional shape of the application area 1 is scanned leading to a digital model 5 of the application area 1. The digital model 5 is displayed e.g. at a computer display and a specialised person performs modelling 9 of the digital model 5 of the application area. Such person thereby performs e.g. digital cutting, digitally removing "material" from or digitally adding "material" to the digital model 5. Furthermore, during modelling 9, additional units e.g. acoustical-to-electrical input converters, signal processing units, electrical-to-mechanic output converters are digitally placed and oriented in the digital model. This is performed with the help of known CAD software. The result of modelling 9, in the case presently considered, is still a digital model 11 of the shell of the hearing device to be manufactured. The digital shell-model 11—in fact a set of data representing such model—is transferred to a production facility 13 where the shell is produced controlled by the data of the digital shell-model 11 and e.g. with a technique as is described in the WO 01/0507 of the same applicant as the present application. After the shell is manufactured, as shown at 13, the hearing device is assembled as shown at 15. Either manually or at least to a part computer-aided, the respective units are assembled with the shell. Thereby, the person or machine performing assembling has obviously present information as to which kind of units are to be assembled with the specific hearing device shell to meet the needs of the individual.

When considering the workflow from in-situ scanning the application area at step 5, modelling 9, up to assembling of the device at step 15, most different organisations exist with respect to the locations where the different steps are performed. Thereby and as an example, in-situ scanning 5 and thereby preparing the digital model may be performed at a first location e.g. at a scanning center, modelling 9 may then be performed at a second location, e.g. at a respectively equipped modelling center, then production 13 of the shell may be performed still at a third location, e.g. at a manufacturing center with respective equipment. Finally, assembling—15—may be done at a fourth location. Thus normally modelling 9 is performed remote from assembling 15.

In a second customary technique of manufacturing a hearing device the formerly addressed in-situ scanning is replaced, as also shown in FIG. 1, by taking a mold of the application area 1 at a step 7 and then ex-situ scanning the mold 7 to result in a digital model of the application area as shown at step $\mathbf{5}_7$. This digital model of the mold is further treated as was explained with respect to the digital model as a result of step 5. With respect to different locations where these steps are performed, the same considerations are valid as addressed above.

In a still further customary manufacturing technique for hearing devices again a mold of the application area 1 is taken at a step 7. Then modelling 17 is manually performed on the mold. Thereby the outer shape of the mold is adjusted by manual cutting operations, adding material or removing material. Finally, a modelled mold results at a step 18 which has the outer shape of the shell to be manufactured. From this modelled mold the shell is molded at a step 19, which is additionally trimmed manually. Thereby the molded shell, e.g. for an in the ear hearing device, may be cut e.g. for exactly delimiting a plane where the faceplate has to be applied. Finally as shown at 21, the additional units which where addressed above are assembled with the shell, resulting in a completed hearing device.

In pursuing this manual manufacturing along the steps 7, 17 to 21 of FIG. 1 and with an eye on the respective locations at which the different manufacturing steps are performed, step 7 of taking the mold in-situ may be performed at a location remote from step 17 of manual, latter remote from step 19 of shell-molding and latter remote from step 21 of assembling.

With an eye on the digitally assisted customary manufacturing techniques, via a digital model, digital modelling which results in digital shell model 11, provides for accurate information of the spatial location and orientation of the different units relative to the shell including e.g. location of faceplate, converter units, processing units, switches, transmitters, receivers etc. Assembling of such units to the shell of the hearing device at the step 15 is performed at a place remote from the place where the modelling step 9 has been performed. Thus, the problem arises that there is a lack of information at the assembling instance as to how positioning and orientation of the addressed units was planed and conceived during the modelling step 9. We call this problem "modelling/assembling information loss".

Also in the manual manufacturing technique such problem may arise, possibly less pronounced than in digitally assisted techniques:

In the manual manufacturing along step 7 to 21 of FIG. 1, during manual modelling 17 it is already planed to a certain extent how and where to provide some of the units of the hearing device as e.g. the faceplate. When finally adjusting the molded shell and/or when assembling the device the problem arises that information is lost where some of the units to be assembled within the shell were planed to reside relative to the shell and during the manual modelling step 17. Thus, here again there may arise the problem of "modelling/assembling information loss".

Still with an eye on FIG. 1 it has to be considered that some of the units which are to be assembled with the shell are most sensitive with respect to their spatial localization and/or orientation, relative to the application area 1, i.e. to individual's head. Thus and in all embodiments and approaches discussed in context with FIG. 1, there may occur a lack of information of how exactly the digital model in step 5 or $\mathbf{5}_7$ was scanned or the mold was taken in step 7 relative to the application area of the individual. Besides possibly some characteristic shaping of the models resulting from steps 5 or $\mathbf{5}_7$ or of the mold resulting from step 7, which may be unambiguously linked to the application area, no information is preserved about the exact positioning and orientation of such model or mold relative to the application area or, even more generic, relative to individual's head. Units which are most sensitive with respect to their spatial location and orientation with respect to the application area or individual's head once they are applied to the individual are e.g. acoustical-to-electrical input converters, i.e. microphone arrangements, input/output ports of wireless signal receivers and—transmitters, especially antennas for such receivers and/or transmitters.

We call this problem of proper spatial localisation and/or orientation of hearing device units with respect to individual's head the problem of "head-related orientation".

A third category of localization and/or orientation problem of units within the shell of a hearing device occurs when units placed at different locations of individual's body have to be placed and/or oriented in an accurate mutual relationship. This is especially true for input/output ports of wireless signal receivers and transmitters which are operated in mutual communication, as especially the addressed antennas for such receivers and/or transmitters. Such antennas must not only be placed and orientated accurately with respect to the application area, thus under the aspect of "head-related orientation", but additionally have to be in an accurate mutual orientation We call this orientation problem "unit to unit orientation".

Thus, three problem types of localizing and orienting units at a hearing device shell have been defined:

A problem resulting from "modeling/assembling information-loss";

a problem with respect to accurate localization and orientation of units related to the application area, the "head related orientation" and problems with respect to mutual orientation and localization of units called "unit to unit orientation". Nevertheless, we treat the problem of head related orientation" and of "unit to unit orientation" under one generic aspect of "related orientation".

Thus the present invention under its different aspects deals with the problem of "modelling/assembling information loss" and/or with the problem of "related orientation".

2. SOLVING "MODELLING/ASSEMBLING INFORMATION LOSS"

In FIG. 2 a first embodiment of the present invention is schematically shown by means of a functional-block representation in analogy to that of FIG. 1. Thereby hearing device manufacturing considered follows either of the digital techniques shown in FIG. 1, i.e. along sequence of steps 3/5/9 to 15 or 3/7/$\mathbf{5}_7$/9 to 15.

At the latest during the modelling step 9 of FIG. 1 which accords with modelling step $\mathbf{9}_{Ma}$ of FIG. 2, a positioning marking 23 is introduced into the digital model. The resulting digital shell-model $\mathbf{11}_{Ma}$ has thus a marking which defines a shell-related orientation system, e.g. a Cartesian coordinate system. Thereby the marking applied to the model $\mathbf{11}_{Ma}$ is of a type which results, during shell manufacturing in step $\mathbf{13}_{Ma}$, in a respective marking of the real shell, e.g. defining a Cartesian coordinate system which is unambiguously detectable at the shell. According to FIG. 2 and in one variant, during the modelling step $\mathbf{9}_{Ma}$, an embossed or projecting mark $P_{\#}$ and a linear, projecting or embossed mark $L_{\#}$ is applied at the inside or the outside of digital shell model $\mathbf{11}_{Ma}$. $P_{\#}$ and $L_{\#}$ commonly define unambiguously a Cartesian coordinate system $x_s, y_s, z_s$. During shell manufacturing $\mathbf{13}_{Ma}$ the respective digitally defined marks $P_{\#}$, $L_{\#}$ are formed into the shell, resulting in real marks P and L.

In the assembling step $\mathbf{15}_{Ma}$ the positioning marking, in the embodiment of FIGS. 2 P and L, are detectable e.g. by an assembling person. All the measures which have been digitally planed and localized during the modelling step $\mathbf{9}_{Ma}$ are defined during such digital modelling relative to the coordinate system $x_s,y_s,z_s$ defined by the positioning marking 23 applied to the digital shell-model.

During modelling $\mathbf{9}_{Ma}$ every point of the shell becomes associated unambiguously to the respectively defined orientation system, according to FIG. 2, e.g. coordinate system $x_s,y_s,z_s$. Because the orientation system is made to also be present at the shell as manufacture, assembling all the units to the shell—as was planed in the modelling step $\mathbf{9}_{Ma}$—may be accurately performed, with reference to the still detectable orientation system, as e.g. to the coordinate system $x_s,y_s,z_s$ defined by the marks P, L.

In a most simple example as shown in FIG. 2, the coordinate system $x_s,y_s,z_s$ defined by the markings P, L at the real shell manufactured is aligned with a respective coordinate system $x_T,y_T,z_T$ at an assembling table 25. Every point of the real shell is unambiguously defined with respect to such coordinate system $x_T,y_T,z_T$ as it was in the digital model $\mathbf{11}_{Ma}$ with respect to the system $x_S,y_s,z_s$.

Thus and as an example, let us assume that during the modelling step $\mathbf{9}_{Ma}$ a unit $U_\#$ e.g. a faceplate, an acoustical-to-electric converter unit, an electrical-to-mechanical converter unit, a signal processing unit, a receiver or transmitter unit with respective antennas etc. has been optimally placed and oriented into or at the digital model $\mathbf{11}_{Ma}$ of the shell. The relative spatial position of unit $U_\#$ to the shell is given e.g. by a set $(\overline{v},\overline{o})$ of orientation entities, as by a vector and a set of angles, which define the location and orientation e.g. of a coordinate system $x_u$, $y_u$, $z_u$ of unit $U_\#$ relative to $x_s$, $y_s$, $z_s$ at the shell. If this information is transmitted e.g. digitally to the assembling facility as shown in dash line in FIG. 2 by the information $I(\overline{v},\overline{o})$, at this assembling facility the complete information is present for assembling all the real units U to the real shell exactly as it was planed to be done digitally, during the modelling step $\mathbf{9}_{Ma}$.

It is clear for the skilled artisan that a large number of different marking techniques may be applied. Important is that, at the real shell as manufactured, the orientation system which has been digitally applied during modelling, is detectable. Then every position of the digital shell-model is accurately found at the real shell.

Under the consideration as to when along the processing paths as of FIG. 1 the positioning marking 23 or, more generically, the orientation system must be applied, it becomes evident that this has to be done at the latest when performing modelling $\mathbf{9}_{Ma}$. Nevertheless and with an eye on FIG. 1 this may already be done during in-situ scanning 5 or during in-situ mold-making 7 or just before scanning $\mathbf{5}_7$ of such mold 7. Thus introducing the addressed orientation system has to occur at the latest when modelling the digital model 5 or $\mathbf{5}_7$ of the application area 1.

Therefrom it becomes clear that markings which are provided upstream the modelling step 9, as especially with a purpose of "related orientation" may be additionally exploited for solving the "modelling/assembling information loss" problem.

In FIG. 3 there is shown a further example of the present invention under the aspects of "modelling/assembling information loss" for the technique comprising taking the mold 7, scanning such mold $\mathbf{5}_7$ up to assembling 15 according to FIG. 1.

When taking the mold 7 of the application area 1, shown at $\mathbf{7}_{Ma}$ in FIG. 3, an orientation system is applied to the mold, e.g. a position marking M as shown in FIG. 3 as an example, a linear groove with two perpendicularly upstanding bores. By such marking M which is worked into the material of the mold $\mathbf{7}_{Ma}$ a coordinate system $x_s,y_s,z_s$ is defined at the mold $\mathbf{7}_{Ma}$. The mold $\mathbf{7}_{Ma}$ with the marking M is then applied to a scanner-support 27 whereon there is provided a positioning arrangement $M_{27}$ which is complementary to the marking M and thus registers with the marking M. The scanner-support 27 carrying the accurately positioned mold $\mathbf{7}_{Ma}$ during scanning operation according to step $\mathbf{5}_7$ of FIG. 1 may be mounted to a positioning plate 28 which is movable e.g. controllably tiltable as shown by the angle α about one, two or three machine coordinate axes $x_m,y_m,z_m$ or displaceable along one or more than one of the addressed axes. Because the controlled, possibly driven movement of positioning plate 28 and, thereon, of mold $\mathbf{7}_{Ma}$ is known—e.g. by providing respective movement detectors (not shown)—the position of the $x_s,y_s,z_s$ system is known as well: In spite of any movement of the mold $\mathbf{7}_{Ma}$ during scanning operation, the orientation system M is kept defined at the digital model $\mathbf{5}_7$ of the mold. Thus during modelling $\mathbf{9}_{Ma}$ of the digital model $\mathbf{5}_7$ to result in the digital shell-model, any modelling action is properly defined with respect to its spatial location relative to the orientation system $x_s$, $y_s$, $z_s$. The modelling step $\mathbf{9}_{Ma}$ results in the digital shell-model. During modelling $\mathbf{9}_{Ma}$ two cases may occur: The marking M at the digital model may be cut away. In such a case during modelling $\mathbf{9}_{Ma}$ there is provided in analogy to adding the position marking 23 of FIG. 2, digitally, a new position marking which will remain detectable at the shell as manufactured in the succeeding step, in analogy to marks P, L in FIG. 2.

In FIG. 4 a further embodiment for producing a marking as an orientation system is schematically shown. According to FIG. 4 scanning of the application area is performed in-situ, thus according to the scanning step 5 of FIG. 1. With respect to individual's head H a specific direction is selected. This direction is advantageously selected to be the direction which the individual, standing upright or sitting upright, considers as "straight forward horizontal direction of sight" as indicated by $h_s$. This subjective direction $h_s$ is an important entity, also for further hearing device fitting to the individual as with respect to the alignment of microphones as for beamforming ability.

The subjective horizontal direction of sight $h_s$ of the individual is registered. A second direction is e.g. selected substantially along the axis of the ear canal of the individual, perpendicular to $h_s$. The horizontal direction of sight $h_s$ is attributed the $y_s$ axis, the perpendicular axis is attributed the $z_s$ axis. There results a right handed Cartesian system, the third axis $x_s$.

The scanner unit 14 has a machine coordinate system $x_m$, $y_m$, $z_m$. The relative positioning of the individual coordinate system $x_s$, $y_s$, $z_s$ to the machine coordinate system $x_m$, $y_m$, $z_m$ is memorized. In the digital data of the scan, digital markings defining for the subjective coordinate system $x_S$, $y_S$, $z_s$ are applied which are utilized for applying structural orientation markings in the finally manufactured shell. Again, in the modeling step, $\mathbf{9}_{Ma}$, units are planned to be assembled in positions relative to such orientation marking, and the manufactured marking is used as a reference system for assembling the units to the shell.

In FIG. 5 a further embodiment is shown, wherein the subjective horizontal line of sight of the individual is exploited in a technique according to FIG. 1, where a mold 7 is taken. Thereby, the direction $h_S$ according to FIG. 4 is directly marked on the support 27 as of FIG. 3, e.g. by marking with a permanent marker or on the mold, while being made at individual's ear.

There results a support 27, with the mold thereon or a mold 7 whereat, by the direction $h_s$ and the direction perpendicular thereto, approximately along the axis of the ear canal, a coordinate system $x_S$, $y_S$, $z_S$ is defined. The relative position including orientation of $x_S$, $y_S$, $z_S$ relative to scanner's machine coordinate system $x_m$, $y_m$, $z_m$ is memorized during scanning of the mold 7. In modeling 9 or $\mathbf{9}_{Ma}$ the placement of units is planned relative to $x_S$, $y_S$, $z_S$. As markings defining for $x_S$, $y_S$, $z_S$ are also assigned to the shell as produced, which markings are detectable by suited means, subsequent assembling of the unit is performed—as was generically addressed—accurately positioned with respect to $x_S$, $y_S$, $z_S$ and thus as planned.

If during scanning of the mold, according to FIG. 1 step $\mathbf{5}_7$, the support 27 with the mold is tilted in analogy to tilting α in FIG. 3 and with respect to the scanner unit, respective angles are registered to keep accurate definition of the $x_S$, $y_S$, $Z_S$ system with respect to the scanner machine coordinate system $x_m$, $y_m$, $z_m$.

As an example and as shown in FIG. 6 during digital modelling the digital model $\mathbf{7}_{Ma\#}$ of mold $\mathbf{7}_{Ma}$ which has been brought into alignment with the machine-coordinate system $x_m$,$y_m$,$z_m$ a cutting is applied at 29. This means that at the subsequent production of the shell the marking M will not be formed as the shell will be produced cut at the cutting line 29 where e.g. a faceplate has to be mounted. Therefore a physical marking which is kept detectable at the assembling step so as to serve as an accurate basis for positioning further units with respect to the shell will be lost.

In this case the positioning markings are digitally added to a part of the model of the mold i.e. to a part which is also part of the model of the shell. As an example according to FIG. 6, the digital cutting plane with line 29 which has been digitally provided e.g. at a locus to apply the faceplate, is brought into a plane as defined by the machine coordinates $x_m$, $y_m$, $z_m$. In this digital position—as displayed e.g. on a computer display—in analogy to the embodiment explained in context with FIG. 2, digital markings $P_\#$, $Q_\#$ are applied, which will appear also in the produced shell. Thus subsequent assembling may be performed exactly as it was explained at step $\mathbf{15}_{Ma}$ of FIG. 2. As was already addressed, whenever the marking M is located in an area of the mold $\mathbf{7}_{Ma}$ which is not or at least not completely cut away during digital modelling, this initial marking M will also appear at the shell as produced and will be exploited in the assembling step as an orientation system for properly allocating and orienting units assembled to the shell, the same way as was planed during digital modelling.

In one embodiment the support 27 may directly be applied together with a mold material to the application area of the individual, thereby serving directly to provide the addressed positioning marking M into the mold and for supporting the hardened mold during the scanning step at $\mathbf{5}_7$.

With an eye back on FIG. 1 and considering the manual manufacturing approach from forming mold 7 via manual modelling 17 to assembling 21, it might be helpful for such assembling to provide at the shell produced by molding an orientation system which defines the positioning of specific characteristic shape-areas of the shell, e.g. of a plane for applying a faceplate, as it was manually modelled in step 17. This is exemplified in FIG. 7.

The mold 7 which has been taken in-situ from the application area 1 for the hearing device is manually modelled whereby, as an example, the mold is manually cut along line 29 which defines the plane for receiving the faceplate. In an additional manual modelling step shown at 17*a* a positioning marking—more generically an orientation system—is manually applied e.g. by three embossments $N_m$ in the mold material e.g. along line 29. These positioning markings $N_m$ in the mold 7 result in respective markings $N_s$ of the shell as molded in the molding step 19 of FIG. 1. Thereby e.g. a coordinate system $x_s$,$y_s$,$z_s$ which was established at the mold 7 during manual modelling is transferred to the shell.

Assembling may now be done in analogy to $\mathbf{15}_{Ma}$ of FIG. 2.

With the help of FIG. 1 to 7 different embodiments have been described, showing how positioning information relative to a shell is preserved from modelling 9 or 17 to assembling 15 or 21.

Thereby an orientation system provided at the latest during the modelling operation 9 or 17 is transferred to the shape of the real shell as manufactured so that the latter has the same orientation system or a different orientation system linked to the former one by known transform-relations, for assembling additional units.

Units are digitally located in the digital model of the shell relative to the orientation system at such digital model and are assembled to the real shell located relative to the orientation system still assigned to the real shell.

As has been discussed in context with FIGS. 1 to 7 when modelling is performed on the basis of a digital model during such digital modelling, an orientation system is introduced e.g. by appropriate markings, which results, once the shell is produced, in a respectively detectable orientation system.

Such orientation system may be introduced by respective markings so that it does not only resolve the "modelling/assembling information loss" but provides for additional assistance during the assembling step 15 of FIG. 1. Such embodiments of the present invention shall be described with an eye on FIGS. 8 to 11.

In these figures on one hand specific markings are exemplified which may be used as an orientation system as was discussed, applied at the latest during digital modelling 9 of FIG. 1 and which additionally serve, for significant improvements, specifically for faceplate assembling, especially for in-the-ear and completely-in-the-canal hearing devices.

In FIG. 8 there is perspectively shown, as displayed e.g. on a computer display, the digital model $\mathbf{80}_\#$ of the shell of an in-the-ear hearing device. The model results from not yet finished digital modelling, be it departing from a scanned digital model 5 of the application area or be it from scanning a mold 7 and resulting in digital model $\mathbf{5}_7$ of FIG. 1. During digital modelling 9, e.g. a module or unit $\mathbf{82}_\#$ is introduced into the shell. The faceplate must have an opening for module $\mathbf{82}_\#$ and a specific outer contour to snugly fit the individual shell $\mathbf{80}_\#$. During assembling, such faceplate will have to be highly individually cut and most precisely mounted to the shell in a specific spatial orientation relative to the shell, so as to properly accommodate the module or unit 82.

Under consideration of this problem, positioning guides, in the embodiment according to FIG. 8 positioning guide arms $\mathbf{88}_\#$, are added to the digital model $\mathbf{80}_\#$ of the shell which project laterally therefrom e.g. along a plane E. At the end of the guide arms $\mathbf{88}_\#$ opposite to those ends joint to the shell $\mathbf{80}_\#$, there are provided guiding bores $\mathbf{90}_\#$.

When the shell is produced at 13 of FIG. 1 from the digital model $\mathbf{80}_\#$ with the addressed guide arms $\mathbf{88}_\#$, this results in a real shell 80 as shown in FIG. 9 having the respective guide arms 88. A faceplate 92 has on one hand projecting guide pins 94 which exactly register with the bores 90 in the arms 88, and which may only be introduced in these bores 90 in one single unambiguous position of plate 92. The shape and orientation of module opening 96 as established during modelling 9 relative to the arms $\mathbf{88}_\#$ is realized relative to the pins 94. The faceplate 92 is applied in a registering manner to the guiding arms 88, thereby exactly establishing the orientation of the module opening 96. The faceplate 92 assembled in accurate position is then fixed as by gluing to the shell 80. Cutting the faceplate 92 along the outer contour of the shell 80 simultaneously removes the guiding arms 88.

Having an eye on the "modelling/assembling information loss", by digitally adding the guide arms $88_{\#}$ according to FIG. 8 to the digital model $80_{\#}$ of the shell, an orientation system is introduced as indicated in FIG. 8 e.g. according to the $x_s,y_s,z_s$ coordinate system shown in FIG. 8. This orientation system is defined with respect to the digital model $80_{\#}$ of the shell. As most obvious from considering FIG. 9, the orientation system, e.g. according to the $x_s,y_s,z_s$ coordinate system, is preserved at the real shell 80 so that additional units may be brought in a defined position relative to the shell. This is in analogy to the explanations given e.g. in context with assembling $15_{Ma}$ of FIG. 2.

Figure 10:
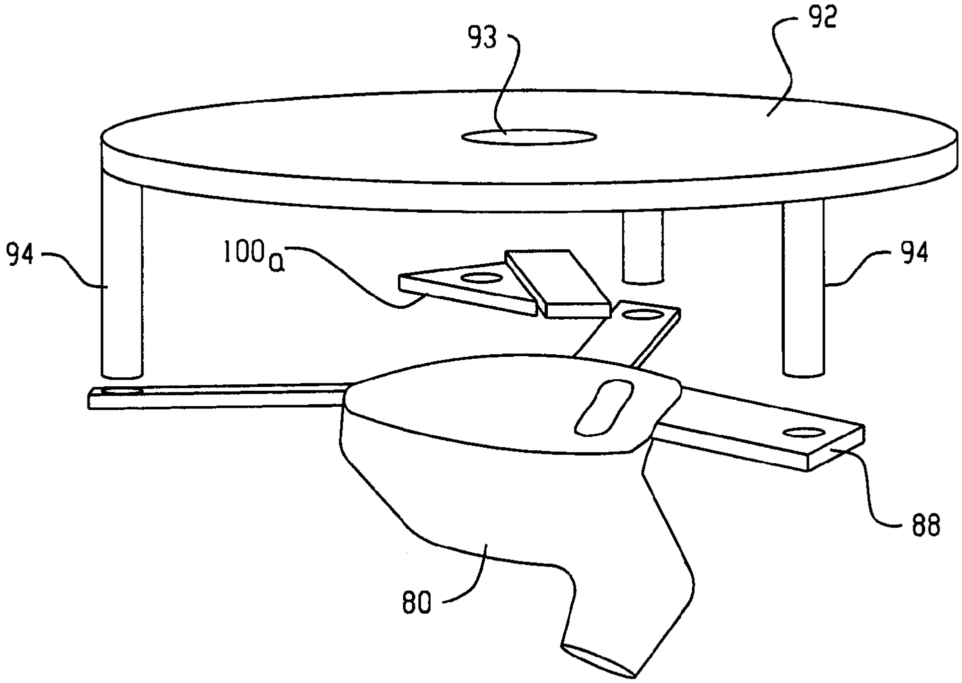
Figure 11:
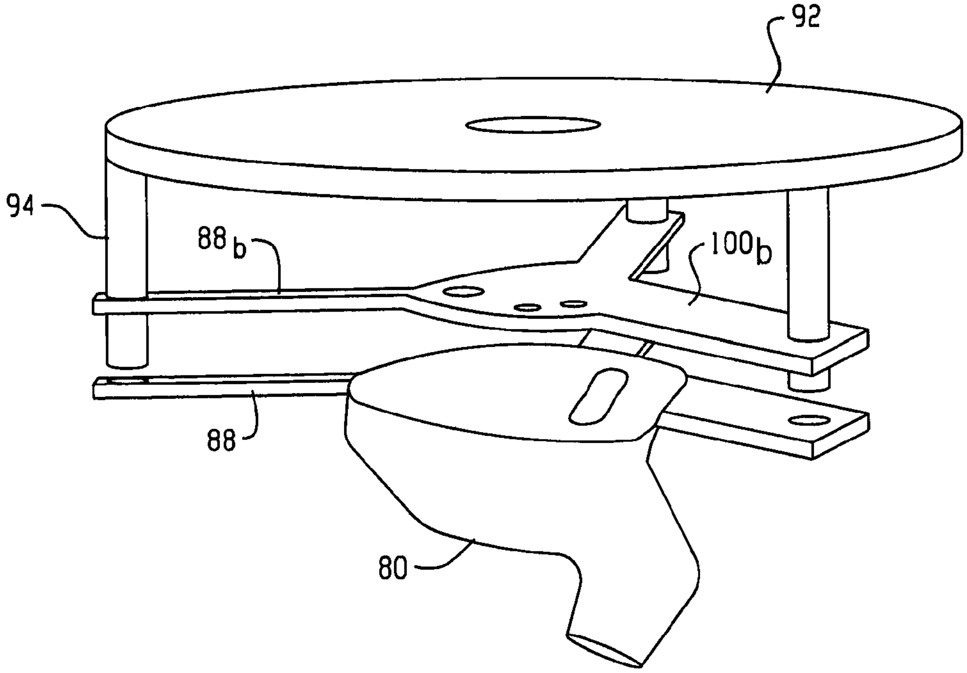

As may be seen from FIGS. 10 and 11 the orientation system 94 which is defined by the guide arms 88 at the shell together with the pins 94 at faceplate 92 may be used for applying additional guide members, e.g. a drilling mask 100.

According to FIG. 10 the guide arms 88 provide for accurate assembly of the faceplate 92 with the pins 94. The battery door opening 93 in FIG. 10 provided within the faceplate 92 is used as a guide for a drilling mask $100_a$.

According to FIG. 11 the addressed drilling mask $100_b$ is positively guided by respective arms $88_b$ at the mask $100_b$ cooperating with the pins 94 of the faceplate 92.

When the hearing device has been assembled with the technique exemplified in the FIGS. 8 to 11, the respective guide arms at the shell are removed as by trimming the faceplate 92 to the individual shape of the shell 80.

Thus, summarizing, the solution according to the present invention to the "modelling/assembling information loss" is to provide an orientation system, at the latest when modelling a mold or a digital model of the application area for the shell and planning the assembling of units to such shell with a position, including spatial orientation, relative to such orientation system.

The information about the orientation system selected as well as about the relative positioning of the respective units to such orientation system is preserved. After manufacturing of the shell as a hardware piece the information about the orientation system is retrieved and the hardware units are assembled to the shell with a positioning, including spatial orientation, as defined relative to the orientation system during the addressed modelling. In one embodiment the manufactured shell has the orientation system sensibly marked thereon, e.g. by respective structures in the shell surface.

3. SOLUTIONS OF "HEAD RELATED POSITIONING"

With an eye back on FIG. 1, the problem addressed here arises when units to be applied to a hearing device are critical with respect to their relative positioning and orientation to the individual's head and/or relative to each other.

One example, where units are applied to a hearing device relative to an orientation system linked to individual's head, has been given in context with modelling/assembling information loss in the FIGS. 4 and 5. There, actually, the orientation system which is based on the horizontal line of sight of the individual is an orientation system assigned to individual's head.

Thereby one serious problem arises from the fact that it is very difficult to accurately define a coordinate system at the head of an individual, which might be used as a reference system for defining positioning and orientation of such units. Units of hearing devices which are most critical to proper orientation and location at individual's head are e.g. input acoustical-to-electrical converter arrangements with two or more than two mutually distant converter units, receiver and transmitter ports for wireless signal transmission and reception respectively and thereby, if operated electro-magnetically, especially respective antennas. Latter are particularly critical with respect to mutual orientation, e.g. if communication is established between two antennas.

Under one aspect of the present invention this problem is resolved by quitting with previous approaches to establish a reference system at an individual's head, under a second aspect a reference system is established at an individual's head, which has been found to be reproducible with sufficient accuracy.

The principal approach according to the one approach shall be explained with the help of a most schematic representation as of FIG. 12. As was explained above, many of the addressed units or devices which are sensitive with respect to their orientation relative to individual's head, are devices or units which are in wireless—e.g. acoustical or inductive or electromagnetic or optical-communication with external signal sources. E.g. an arrangement of two or more acoustical-to-electrical converters is exposed to acoustical sources in individual's acoustical surrounding and it is necessary e.g. for subsequent signal processing at the hearing device, that acoustical signal sources are seen from such multiple converter arrangement at predetermined spatial angles relative to individual's head.

Similarly a wireless transmission or reception port at the hearing device shall see a reception port or a respective signal source located at a predetermined position with respect to individual's head carrying the hearing device. Still similarly a transmission or reception port for electromagnetic signals shall be provided with a respective antenna which receives or transmits electro-magnetic signals from a source or to a receiver respectively, located in a predetermined angular position with respect to individual's head carrying the respective hearing device. Most pronounced is the addressed problem in the art of binaural hearing systems, where intercommunication shall be established by electromagnetic wireless transmission between antennas provided at hearing devices applied to both individual's ears. In this case proper orientation of the antennas assigned to each of the ears is of utmost importance for optimum signal transfer at lowest possible energy.

Thereby it has to be considered that finally all these units or devices have to be embedded in a hearing device properly applied to the respective application area of an individual, be it in the ear canal or just in the ear or outside the ear.

We call such position and/or orientation critical unit an OSU (Orientation Sensitive Unit).

According to FIG. 12 an OSU which is to be built in a hearing device is applied adjacent to the application area 32 for the hearing device. If the OSU is a transmission unit 30 e.g. a transmission port of a transmitter or a transmission antenna, the OSU is fed as schematically shown by source 33 with a signal which accords as exactly as possible with a signal which will have to be transmitted by such OSU 30 once built into the hearing device. At a remote predetermined location a receiver unit 34 is installed where the signal received from the OSU 30 is monitored. The head of the individual is e.g. stabilised, location and orientation of the transmitter unit is varied in-situ systematically up to optimum signal reception at receiver unit 34. Once the optimum positioning of OSU 30 with respect to individual's head is found, most generically spoken, this positioning is memorized with respect to the shape and location of the application area 32 for the hearing device as will be explained.

In analogy whenever optimum positioning and orientation is to be found for a receiver OSU 38 such unit 38 is applied adjacent to the application area 32 where the hearing device which shall contain such unit 38 is to be applied. The receiver OSU 38 is exposed to a remote signal source 40 located at a predetermined location. Again positioning and orientation of the OSU 38 is varied in-situ adjacent to the application area and the received signal is monitored as schematically shown in FIG. 12 at 42. The optimum position and orientation is found adjacent to the application area 32 of the individual for optimum signal transmission between source 40 and OSU 38. Then the location and orientation of OSU 38 with respect to the application area 32 is memorized as will be explained below.

In the case optimum mutual positioning and orientation is to be found between transmission/reception antennas of a pair of hearing devices being part of a binaural hearing system, the procedure is quite analogous to that which was just described in context with FIG. 12. This procedure is schematically shown in FIG. 13.

To each ear of an individual 44 a transmission/reception antenna equal to the respective antennas to be built in the respective hearing devices of a binaural hearing system is applied. This may be in the ear or completely in the canal or outside the ear. The output e.g. of the right ear antenna $\mathbf{46}_r$ is connected to a monitoring unit $\mathbf{48}_r$ whereas the respective antenna $\mathbf{46}_l$ at the left ear is connected to a signal generator unit $\mathbf{50}_l$. By mutually varying the position and the orientation of the two antennas $\mathbf{46}_r$ and $\mathbf{46}_l$ in operation the mutual optimum signal transmission position and orientation is found. For additional accuracy the right ear antenna $\mathbf{46}_r$ is switched to a signal source $\mathbf{50}_r$ and antenna $\mathbf{46}_l$ respectively to monitoring unit $\mathbf{48}_l$. By mutually adjusting the positioning and spatial orientation of the two antennas adjacent to their respective application areas, optimum one- or bi-directional transmission between the antennas is established. Once this optimum position and mutual spatial orientation is found the respective location and orientation of the two antennas $\mathbf{46}_r$ and $\mathbf{46}_l$ with respect to their respective application areas, according to FIG. 13 the respective ear canals, is memorized as will be further explained.

The OSU-units 30 and 38 of FIG. 12 or $\mathbf{46}_r$ and $\mathbf{46}_l$ as of FIG. 13 are applied adjacent to their respective application areas dependent on their accessibility. OSU-units, which as exactly as possible accord with the respective units to be built in the hearing device, are e.g. mounted to respectively tailored probes as e.g. to probes of endoscope-type through which signal feeding is established to or from such unit.

For accurately changing and adjusting the positions and orientation of the respective units the probes are best mounted adjustably in position and orientation to an overall measuring system (not shown) and relative to individual's head.

As was addressed above once optimum reception or transmission is reached at a position or orientation of a respective OSU, it is important to memorize such position and orientation with respect to the application area 32 of the hearing device which will be provided with such OSU.

With an eye on the FIGS. 12 and 13 we have described a technique for finding an accurate positioning of units to be integrated into a hearing device which positioning is to be established relative to a signal source or a signal receiver external to the addressed hearing device.

Summarizing, there has been proposed:

a method of manufacturing a hearing device with a shell and with a unit therein, the output of the unit in operation being dependent from spatial position and/or orientation thereof and comprising:

applying the unit in-situ adjacent an application area for the hearing device;

operating the unit and monitoring the output signal of said unit;

varying position and/or orientation of the unit to optimize the output as monitored;

holding an optimum position of the unit as found;

generating a model of the application area for the device at said individual and with said unit in optimum position, and manufacturing the hearing device in dependency of said model as generated.

It is considered that this generic approach is per se inventive. This approach, as clear to the skilled artisan, is combinable with the other aspects of the present invention, thereby especially the modelling/assembling information loss aspect.

The above generic teaching is clearly most suited to be applied for properly positioning a receiver and/or transmitter antenna at a hearing device. Thereby, positioning of such antenna is varied in-situ up to achieving at a predetermined external locus optimum reception and/or up to achieving at the antenna optimum reception.

Further, the addressed approach is clearly most suited for mutually adjusting the positions of antennas provided at the hearing devices of a binaural hearing system.

Turning now back to the various manufacturing techniques for hearing devices as of FIG. 1, let us first discuss such memorizing optimum positions as found according to the FIGS. 12, 13, in the case of in-situ scanning the application area of the hearing device as shown at 5 of FIG. 1. In this case once e.g. by means of an endoscope-like probe a respective OSU has been optimally positioned and oriented adjacent to the application area intended for the hearing device, the application area with the OSU still applied nearby is scanned leading to a digital model 11 of the application area with the probe and OSU positioned thereat. The digital "picture" of the probe and OSU within the digital model of the application area on one hand unambiguously defines for the position and orientation of the OSU with respect to the application area and within the hearing device. Thereby the position and orientation of the OSU with respect to the application area and with respect to individual's head is memorized. The picture of the OSU possibly with the probe may, on the other hand, be used as a positioning marking under the aspect of "modelling/assembling information loss" as described above.

According to FIG. 14 in-situ scanning the application area for the hearing device whereby, as by a probe 39, an OSU 30/38 as of FIG. 12 is introduced, results, as shown in block 52, in a digital model of the application area including the respective OSU 30/38 and probe 39. Modelling of the digital model is performed as was explained in context with FIG. 2. If the OSU 30/38 is not of a ball- or of a cylindrical shape, a coordinate system $x_s, y_s, z_s$ may be unambiguously assigned to the digital picture of the OSU. The position of the OSU is unambiguously defined within the digital model of the application area for the hearing device as shown in block 52, and in fact accords with a digital positioning marking $P_{\#}$, $L_{\#}$ as explained in context with FIG. 2.

In such case and with an eye on FIG. 2 there is no need to additionally provide a positioning marking to the digital model of the application area: Such positioning marking is established by the picture of the OSU. The exact position and orientation of the OSU 30/38 for subsequent shell-manufacturing is established during the modelling 9 by digitally providing a holder facility for the OSU. Such holder facility $\mathbf{55}_{\#}$ for the OSU 30/38 will be shaped at the real shell as subsequently manufactured and may then be exploited as an orientation system in assembling of additional units to the real shell as planned during the digital modelling step 9. Thus the real shell 53 as manufactured in production steps 13 will have the holding-facility 55 to which the shell specific coordinate system x,y,z is assigned to and from which, in analogy to the representation of FIG. 2, the orientation and positioning of additional units to be assembled to the shell 53 e.g. of a base plate 56 is unambiguously related to. In the assembling step 15 of FIG. 14 the shell 53 may e.g. be held for assembling in a predetermined position as defined by the holding facility 55. Additional units, the position and orientation of which having been defined with respect to system $x_s$,$y_s$,$z_s$ during modelling 9 are accurately assembled in that position and with that orientation as was planned during modelling 9.

In this embodiment holding facilities or members are additionally exploited as a positioning marking. These members are integral to the shell for holding a unit, the relative position of which having been accurately established with respect to the application area in-situ. These members are exploited as an orientation system for assembling additional units to the shell in positions and with orientations as were planned during modelling.

Turning back to the second manufacturing approach according to FIG. 1 namely with the steps 7, $\mathbf{5_7}$ and 9 to 15. With help of FIGS. 15 to 17 a technique shall be explained for memorizing accurate positioning of an OSU 30/38 within mold 7. The OSU 30/38 is introduced as by an endoscope-type probe adjacent to the application area for the hearing device which is shown as the ear canal 60 of an individual. Thereby and as was already mentioned, the head of the individual is at least substantially stable as schematically shown at 62. By appropriate moving the probe 64 and monitoring signal reception or—transmission characteristics as was explained in context with FIGS. 12 and 13, the optimum orientation and position of OSU 30/38 is found. Then the probe 64 with the OSU 30/38 is at least substantially stabilized as schematically shown in FIG. 16 at 66. Still with the probe 64 with OSU 30/38 in the optimum position and orientation as found, the mold material 68 is applied to the application area and the probe 64 with OSU 30/38 are embedded therein. Removing the mold results in a mold $\mathbf{7_a}$ wherein the probe 64 with the OSU 30/38 is firmly held. During the subsequent ex-situ scanning operation of the mold $\mathbf{7_a}$ according to step $\mathbf{5_7}$ of FIG. 1, not only the external shape of the mold $\mathbf{7_a}$ is registered but additionally the position and orientation of probe 64 with OSU 30/38 within the mold $\mathbf{7_a}$. This may be done by appropriately selecting the mold material, as e.g. to be transparent, and the scanning technique.

With the digital model of mold $\mathbf{7_a}$ memorized the subsequent manufacturing steps are done in analogy to those explained in context with FIG. 14.

The technique of in-situ positioning and orienting an OSU 30/38 relative to the application area in operating condition and memorizing such relative positioning and orientation information in a mold or in a scan thereby additionally exploiting such OSU for defining a coordinate system bound to the shell is less suited for manual modelling along the manufacturing approach 7 to 21 of FIG. 1. It goes without saying that the technique of in-situ positioning the unit 30/38 relative to the application area and memorizing such relative positioning and orientation may be done for all positioning/orientation critical units as were mentioned above, critical with respect to positioning and orientation with respect to an individual's head.

Further approaches shall now be discussed for proper positioning and orienting an OSU without monitoring its respective reception or transmission characteristic in-situ as was the subject of the previously described embodiments in accordance with FIGS. 12 to 17.

Let us first consider the manufacturing approach according to which the application area is scanned according to step 5 and a digital model of the application area is then digitally modelled according to step 9 of FIG. 1. A further approach in this manufacturing technique is to scan the application area for the hearing device together with a characteristic part or area of individual's head so as to get an overall digital model including a digital model of at least one application area for a hearing device and a digital model of individual's head or at least of a significant part thereof. This approach is schematically shown in FIG. 18.

According to FIG. 18 not only the application area as e.g. an ear canal 120 is scanned but additionally a significant part of individual's head as e.g. a part of the nose bridge. There results an overall digital model $\mathbf{124_\#}$ with digital model $\mathbf{120_\#}$ of the application area and digital model $\mathbf{122_\#}$ of such significant part of individual's head. As in the digital model $\mathbf{124_\#}$ the relative localization and orientation of the application area $\mathbf{120_\#}$ with respect to the significant area $\mathbf{122_\#}$ of individual's head is defined, an OSU $\mathbf{126_\#}$ may be located during digital modelling in correct position and orientation with respect to individual's head. This is obviously also true if, as shown in dash lines in FIG. 18, in both ears mutually communicating OSU $\mathbf{126_\#}$ and $\mathbf{126'_\#}$ as especially mutually communicating antennas are to be provided. In this case both application areas are scanned to form, together with their digital models $\mathbf{120_\#}$ and $\mathbf{120'_\#}$, a unitary digital model $\mathbf{124_\#}$, wherein relative positioning and orientation of both application areas are preserved.

It has further to be noted that it is just necessary to scan and thereby form the digital model $\mathbf{120_\#}$ and the digital model $\mathbf{122_\#}$ which both may be of a restricted area of individual's head as long as the mutual positioning including spatial orientation of the two parts of the digital model $\mathbf{124_\#}$ are preserved.

As the relative position and orientation of every point W of the application area as modelled and of units digitally applied during modelling with respect to the significant part of individual's head $\mathbf{122_\#}$ are known, OSU's and also other units to be provided may digitally be properly placed and oriented.

It has further to be noted the similarity of the approach according to FIG. 18 with the approach as was discussed in context with FIGS. 4 and 5. There in FIGS. 4 and 5 and instead of a significant area $\mathbf{122_\#}$ of individual's head the individual horizontal direction of sight was exploited as basis for the orientation system.

When one or more than one OSU's or other units are properly positioned and oriented in the digital model, further manufacturing processing is done e.g. as was addressed in context with FIG. 14: Respective holding facilities (not shown in FIG. 18) as were explained in context with FIG. 14 at $\mathbf{55_\#}$ are exploited as an orientation system for properly positioning and orienting other units in the assembling step 15 of FIG. 14 to the respective shells.

When considering in FIG. 1 the manufacturing approach of taking a mold 7 and scanning such mold at $\mathbf{5_7}$ two further embodiments of the present invention may be realized.

In the first approach which is analogous to the approach which was explained in context with FIG. 18, a mold is taken not only from the application area but also from a further significant part of individual's head. This is schematically shown in FIG. 19.

According to FIG. 19 the mold-taking-step denoted at 7 of FIG. 1 is shown to be performed by providing the mold material at the application area 130 where the hearing device is later to be worn e.g. to the ear canal. The mold material thereby resides on a support arrangement e.g. a support plate 132 which arrangement is kept fixed to the molding material also during its hardening at the application area 130. A second mold 134 is taken from a significant area of individual's head as e.g. from the bridge 131 of individual's nose. The material of mold 134 is also supported on a respectively shaped support 136. The spatial relation of mold 134 i.e. of support 136 and of the mold of the application area 130 i.e. of support 132 is memorized. This may be done, as schematically shown in FIG. 19 by establishing a mechanical link 138 between the two support 132 and 136 but might clearly also be established by measuring the relative geometric positioning of the two supports 132 and 136 in-situ at individual's head.

In a next step and according to $5_7$ of FIG. 1, after removal of the two molds of FIG. 19 at least the mold which was taken from the application area 130 is scanned resulting in model $140_{\#}$ of FIG. 20. Different techniques may be used to accurately locate the digital model $140_{\#}$ with respect to the selected specific area at individual's head, e.g. to the bridge of individual's nose. If a mechanical link 138 was established when taking both molds in-situ, scanning may be made in one scanning process for both molds being kept in that relative position as adjusted in-situ. This results in digital models of both molds with memorized relative spatial relation.

If relative in-situ positioning of the two molds has been measured in-situ this measuring information is entered into the digital model thereby establishing an unambiguous geometric positioning and orientation of the model $140_{\#}$ to individual's head.

Most generically, establishing a link of the digital model $140_{\#}$ to individual's head via a geometric localization with respect to a specific area at individual's head, e.g. to the bridge of his nose in the digital model, is shown in FIG. 20 with the link $\overline{W}$ to such significant area $S_{\#}$ of individual's head. This geometric relation has been taken in-situ when the mold of the application area was made at the individual. Because the relative geometric position and orientation of the digital model of mold $140_{\#}$ is defined with respect to individual's head during digital modelling (see analog embodiments of FIGS. 4, 5) also OSU's may accurately be placed. Thus by the technique as explained with the help of FIGS. 19 and 20 a "head-related positioning" of units applied to the hearing device is realised and, additionally, such units installed during digital modelling in the digital model of the shell define an orientation system within the digital model of the shell as schematically shown by the x,y,z system in FIG. 20. This orientation system may be used under the aspect of "modelling/assembling information loss" as was explained in context with FIG. 14 for accurately assembling whatever units to the shell as manufactured in the assembling step.

The technique which has been described in context with FIGS. 19 and 20 may be applied analogously to binaural hearing systems with two hearing devices which are in mutual, wireless communication as shown in FIG. 21. After the explanations which were given with respect to FIGS. 19 and 20, FIG. 21 is self-explanatory for the skilled artisan: As a specific area of the individual's head, according to the embodiment of FIG. 21 the geometric relative position—138'—and orientation of the molds of two application areas, is monitored in-situ and is memorized with the digital models of the two molds. Monitoring and memorizing the geometric relative position and orientation of two or more than two spaced apart molds addressed in the embodiments of FIGS. 19, 20 and 21 may e.g. be performed by photographic technique.

With respect to providing in the digital modelling step according to 9 of FIG. 1 the respective additional units thereby especially OSU's e.g. communication antennas at each of the hearing devices and with respect to proper assembling, the same considerations prevail as were given with respect to the FIGS. 19 and 20.

A further embodiment of the present invention under one of its aspects shall be explained with a help of the embodiment of FIG. 22. It is primarily directed on resolving "head related positioning" and thereby the aspect "unit-to-unit positioning" at binaural hearing systems with two hearing devices, each made by preparing a mold 7 and by mold scanning $5_7$ according to FIG. 1. Thereby no geometric interlinking in-situ according to FIG. 21 is necessary and no in-situ measurements as of the embodiment of FIG. 13. If at all a measurement of specific characteristic distances and orientations at individual's head is performed in-situ then such measurement shall be simpler and less time-consuming than e.g. measurements of mutual geometric relation according to FIG. 21 although possibly less accurate.

According to FIG. 22, one mold of each application area at each of individual's ears is prepared in-situ, mutually independently. Scanning according to step $5_7$ of FIG. 2 results, as shown in FIG. 22, in two digital models $140_{r\#}$ of the right ear mold and $140_{l\#}$ of the left ear mold, e.g. displayed on a computer display. In the digital model display, where both in fact independently scanned molds are shown, the location of the model $SP_{\#}$ of the sagittal plane of individual's head is estimated with respect to one of the two digital mold models, according to FIG. 22 with respect to model $140_{r\#}$. The location of the sagittal plane may be estimated by different approaches:

- During in-situ mold taking, the impression basis is flattened using a flat plane or plate. On both sides of individual's head the resulting two flat planes are selected substantially parallel, thereby indicating an approximation of the sagittal mid-nose orientation. During subsequent scanning the flattened areas of the molds are also scanned and therefrom the orientation of the sagittal plane with respect to at least one of the molds is estimated.
- The location of the sagittal plane is estimated from characteristic shape features of the mold in the digital model of the molds. Thereby, statistic evaluation may be applied from standard shapes of the molded area and their spatial orientations to the addressed sagittal plane.
- The location of the sagittal plane may further be estimated from comparing prevailing molds of the application areas of the individual with standard shapes of such application areas and their geometric standard relation to the sagittal plane.

The digital model $140_{r\#}$ of the mold is digitally mirrored at the digital model $SP_{\#}$ of the sagittal plane which results according to FIG. 22 in a mirrored digital model $140_{mr\#}$. Clearly such mirroring is performed three-dimensionally as all the digital models of the molds as well as the model of the sagittal plane are three-dimensionally. In a further step the two digital models $140_{mr\#}$ and $140_{l\#}$ are brought into best-possible covering alignment as shown by the arrow A and dash line representation at $140'_{l\#}$.

Optimum alignment of the two three-dimensional models may be found with help of respective software, principally minimizing the overall intermediate space Q between the two envelopes of the three-dimensional models. In this mutual position of the aligned digital models, during digital modelling as of step 9 of FIG. 2, special OSU's are introduced at both aligned models and in alignment as well, as shown by the two units $146_{l\#}$ and $146_{mr\#}$. Once these units are located the digital model $140'_{mr\#}$, which previously was mirrored at the digital image of the sagittal plane $SP_{\#}$, is mirrored back together with the model of unit $146_{mr\#}$, as shown at $146_{mmr\#}$ in dash lines.

By following the approach as has been exemplified with the help of FIG. 22 a near optimum placement and orientation of OSU's is reached in each of the hearing devices, which OSU's have to be placed in a predetermined mutual orientation. Each of the individual molds with the OSU's or other additional units introduced define a respective orientation system which may be exploited during individual assembling of the hearing devices as was already addressed. The approach as exemplified in FIG. 22 is especially suited for near optimum location of antennas in two hearing devices of a binaural hearing system which have to be in mutual electromagnetic communication. It has to be noted that the approach as was described with the help of FIG. 22 based on mold-taking and subsequent scanning may also, as perfectly clear to the skilled artisan, be performed based on in-situ scanning of both application areas and of an established sagittal plane.

In the embodiments as have been shown and described in context with the FIGS. 4, 5, 18-22 an orientation system is established at individual's head before modelling, and the relative positioning and orientation of the application area is retrieved and preserved with respect to such orientation system. Thereby, it becomes possible to position and to orient units in a predetermined manner relative to individual's head. This is especially important for OSU's as addressed above. According to FIGS. 4 and 5, the orientation system is based on the horizontal line of sight. In the embodiments according to the FIGS. 18 to 20 it is based on individual's nose, whereas according to the embodiment of FIG. 22 it is based on the sagittal plane of the individual.

In FIG. 23 the common generic concept is schematically shown, which is followed by these addressed embodiments.

A hearing device HD is to be applied to the application area 150 of individual's head H. A unit 152 is to be applied to the hearing device HD in a predetermined position and especially in a predetermined orientation with respect to a first orientation system, which is external to the device and which is only established as the device HD is worn by the individual. In FIG. 23 such first orientation system is schematically shown at $O_1$ and the predetermined orientation and position of unit 152 relative thereto by the double-arrow S. This addressed first orientation system $O_1$ needs not be a part of individual's head, it may be e.g. a second unit which is applied at a second hearing device in a binaural hearing device system.

According to the addressed embodiments a digital model of the application area is made for the device as shown at $150_{\#}$. A second orientation system $O_2$ is selected, which is part of the individual, i.e. preferably of individual's head as shown in FIG. 23. Such a second orientation system $O_2$ is e.g. based on the horizontal line of sight, individual's nose or the sagittal plane as was addressed above or on a second application area for a second hearing device.

Information is provided and preserved, which defines localization including orientation of the application area 150 relative to the second orientation system $O_2$ as represented by the double-arrow T in FIG. 23 as well as information defining localization including orientation of the first orientation system $O_1$ relative to the second orientation system $O_2$. E.g. with an eye on the embodiment of FIG. 22 the first orientation system $O_1$ is one of the units 146, whereas the second orientation system at individual's head is the sagittal plane.

According to the FIGS. 4 and 5 a unit, e.g. an input acoustical to electrical converter arrangement, is to be positioned in a predetermined manner relative to the horizontal line of sight. As this basis for the orientation system is already provided as a part of individual's head and departing from the generic definition as of FIG. 23, the first and the second orientation systems are here both formed by one common orientation system.

Thus, as was addressed, localization including orientation information on one hand of the application area 150 with respect to the second orientation system $O_2$ and of the first orientation system $O_1$ with respect to the second one $O_2$ as generically shown in FIG. 23 by the double-arrow V are provided and preserved.

Exploiting the digital model $150_{\#}$ of the application area as well as the information according to T and V preserved, a digital model of the shell is generated with the unit as shown in FIG. 23 by $HD_{\#}$ and $152_{\#}$.

It is evident that from the digital model of the application area $150_{\#}$ with the help of the information according to $T_{\#}$ the location of $O_{2\#}$ is found, with the help of the information $V_{\#}$ the location of $O_{2\#}$ and that from this location, location and orientation of the model $152_{\#}$ of the unit 152 is found via the predetermined relationship according to $S_{\#}$. Once the addressed digital model is generated manufacturing of the shell with the unit is performed in dependency of such digital model.

By the present invention under all its aspects solutions of the "modelling/assembling information loss" as well as of "related positioning" are presented whereby later solutions may also be exploited under the aspect of the former aspect.

The invention claimed is:

1. A method of manufacturing a hearing device comprising:

- adapting said device being adapted to be applied with a shell to an application area at one ear of an individual, said device comprising the shell and a unit in said shell, with the constraint that when said device is worn at said one ear of said individual, said unit has to be located at a desired spatial orientation with respect to a distinct area at the individual's other ear, the method comprising:
- establishing a first orientation system remote from said application area at said one ear of said individual and linked to said distinct area at said individual's other ear;
- establishing a desired spatial orientation of the unit relative to the first orientation system and providing and preserving first information defining localization including orientation of said unit relative to said first orientation system;
- generating a digital model of the application area for said device;
- selecting a second orientation system at said individual and linked to said application area,
  - wherein said second orientation system is selected to be based on a sagittal plane of said individual, and
  - wherein said first orientation system is a further unit at a further hearing device, further comprising
  - providing a digital model of said sagittal plane in said digital model of said application area;
  - generating a digital model of a further application area for said further hearing device at said individual;
  - mirroring said digital model of said application area at said model of said sagittal plane resulting in a mirrored digital model;
  - bringing said mirrored digital model and said digital model of said further application area digitally into a best-possible mutual covering position;

modeling said unit and said further unit digitally in said models in mutual covering positions;

mirroring back together said digital model of said application area with said model of said unit at said model of said sagittal plane;

providing and preserving second information defining localization including orientation of said application area and of said first orientation system relative to said second orientation system;

generating a digital model of said shell with said unit in dependency of said digital model of said application area and in dependency of said preserved first and second information; and manufacturing said shell with said unit in dependency of said digital model of said shell with said unit, thereby establishing spatial orientation of said unit within said shell so as to establish said desired spatial orientation of the unit relative to said distinct area at the individual's other ear as said device is worn by said individual at said one ear of said individual.

2. The method of claim 1, further comprising selecting said second orientation system to be said first orientation system.

3. The method of claim 1, wherein said second orientation system is based on a horizontal line of sight of said individual.

4. The method of claim 1, wherein said unit is an acoustical-to-electrical converter arrangement.

5. The method of claim 1, wherein said further unit is provided in a further hearing device for said individual.

6. The method of claim 1, wherein said hearing device and said further hearing device are parts of a binaural hearing system.

7. The method of claim 1, wherein said hearing device is a completely-in-the-canal hearing device.

8. The method of claim 1, wherein said hearing device is a hearing aid device.

9. The method of claim 1 wherein said unit is an input or output port for a wireless receiver/transmitter.

10. The method of claim 1 wherein said unit is a receiver or transmitter antenna.

11. The method of claim 1, wherein said hearing device is an in-the-ear hearing device.

12. The method of claim 1, wherein said hearing device is an outside-the-ear hearing device.

* * * * *